US006921446B2

(12) United States Patent
Takagi

(10) Patent No.: US 6,921,446 B2
(45) Date of Patent: Jul. 26, 2005

(54) SYSTEM AND METHOD FOR PRODUCING TIRE

(75) Inventor: Shigemasa Takagi, Hashima (JP)

(73) Assignee: Fuji Seiko Co., Ltd., Gifu (JP)

( * ) Notice: Subject to any disclaimer, the term of this patent is extended or adjusted under 35 U.S.C. 154(b) by 260 days.

(21) Appl. No.: 10/110,758

(22) PCT Filed: Aug. 21, 2001

(86) PCT No.: PCT/JP01/07154

§ 371 (c)(1),
(2), (4) Date: Apr. 16, 2002

(87) PCT Pub. No.: WO02/16118

PCT Pub. Date: Feb. 28, 2002

(65) Prior Publication Data

US 2002/0153083 A1 Oct. 24, 2002

(30) Foreign Application Priority Data

| Aug. 21, 2000 | (JP) | ......................................... | 2000-250165 |
| Feb. 8, 2001 | (JP) | ......................................... | 2001-032626 |
| Aug. 9, 2001 | (JP) | ......................................... | 2001-242622 |

(51) Int. Cl.[7] ............................................... B29D 30/08
(52) U.S. Cl. ........................ 156/111; 156/117; 156/130; 156/133; 156/396; 156/397
(58) Field of Search .................................. 156/111, 117, 156/123, 130, 130.7, 131, 133, 396, 173–175, 397, 405.1, 406.2

(56) References Cited

U.S. PATENT DOCUMENTS

| 885,219 | A | * | 4/1908 | Bayne .......................... 138/130 |
| 1,337,690 | A | * | 4/1920 | Converse et al. ............ 156/174 |
| 4,053,342 | A | | 10/1977 | Appleby et al. ............. 156/123 |
| 4,877,468 | A | * | 10/1989 | Siegenthaler ................ 156/111 |
| 4,963,207 | A | * | 10/1990 | Laurent ....................... 156/117 |
| 5,114,511 | A | * | 5/1992 | Goodfellow ................. 156/133 |
| 5,141,587 | A | * | 8/1992 | Sumiuchi et al. ........... 156/396 |
| 5,192,390 | A | * | 3/1993 | Perkins ........................ 156/425 |
| 5,335,415 | A | | 8/1994 | Okufuji ........................ 29/820 |
| 5,399,225 | A | * | 3/1995 | Miyamoto et al. .......... 156/396 |

FOREIGN PATENT DOCUMENTS

| EP | 0067788 | A2 | 12/1982 |
| EP | 0740999 | A2 | 11/1996 |
| EP | 0875364 | A2 | 11/1998 |
| EP | 922561 | A2 * | 6/1999 |
| EP | 0927629 | A2 | 7/1999 |
| GB | 372043 | | 3/1931 |
| GB | 513127 | | 3/1938 |
| GB | 960488 | * | 6/1964 |
| JP | 57-137139 | | 8/1982 |
| JP | 57-205131 | | 12/1982 |
| JP | 60-204314 | | 10/1985 |
| JP | 02-025321 | | 1/1990 |
| JP | 10-235744 | | 9/1998 |
| JP | 11-42651 | | 2/1999 |
| JP | 11-198246 | | 7/1999 |
| JP | 11-227065 | | 8/1999 |
| JP | 11-240080 | | 9/1999 |
| JP | 0970797 | A2 | 1/2000 |
| JP | 2000-79643 | | 3/2000 |
| JP | 2001-145961 | | 5/2001 |
| WO | WO 89/04246 | | 5/1989 |

* cited by examiner

*Primary Examiner*—Geoffrey L. Knable
(74) *Attorney, Agent, or Firm*—Sheridan Ross PC

(57) ABSTRACT

A ply station 12, a band station 13, a shaping station 14, and a belt-tread station 15 are disposed along one side of a conveyor line 11 which extends linearly. A first feeding apparatus 16 disposed between the stations 12, 13, a second feeding apparatus 17 between the stations 13, 14, and a third feeding apparatus 18 between the stations 15, 14 are movably supported on the conveyor line 11. A vulcanizing station 19 comprising a plurality of vulcanizers 20 is disposed on a second side of the conveyor line 11. A delivery apparatus 22 is disposed between the vulcanizing station 19 and the shaping station 14.

28 Claims, 17 Drawing Sheets

L1: 長さ

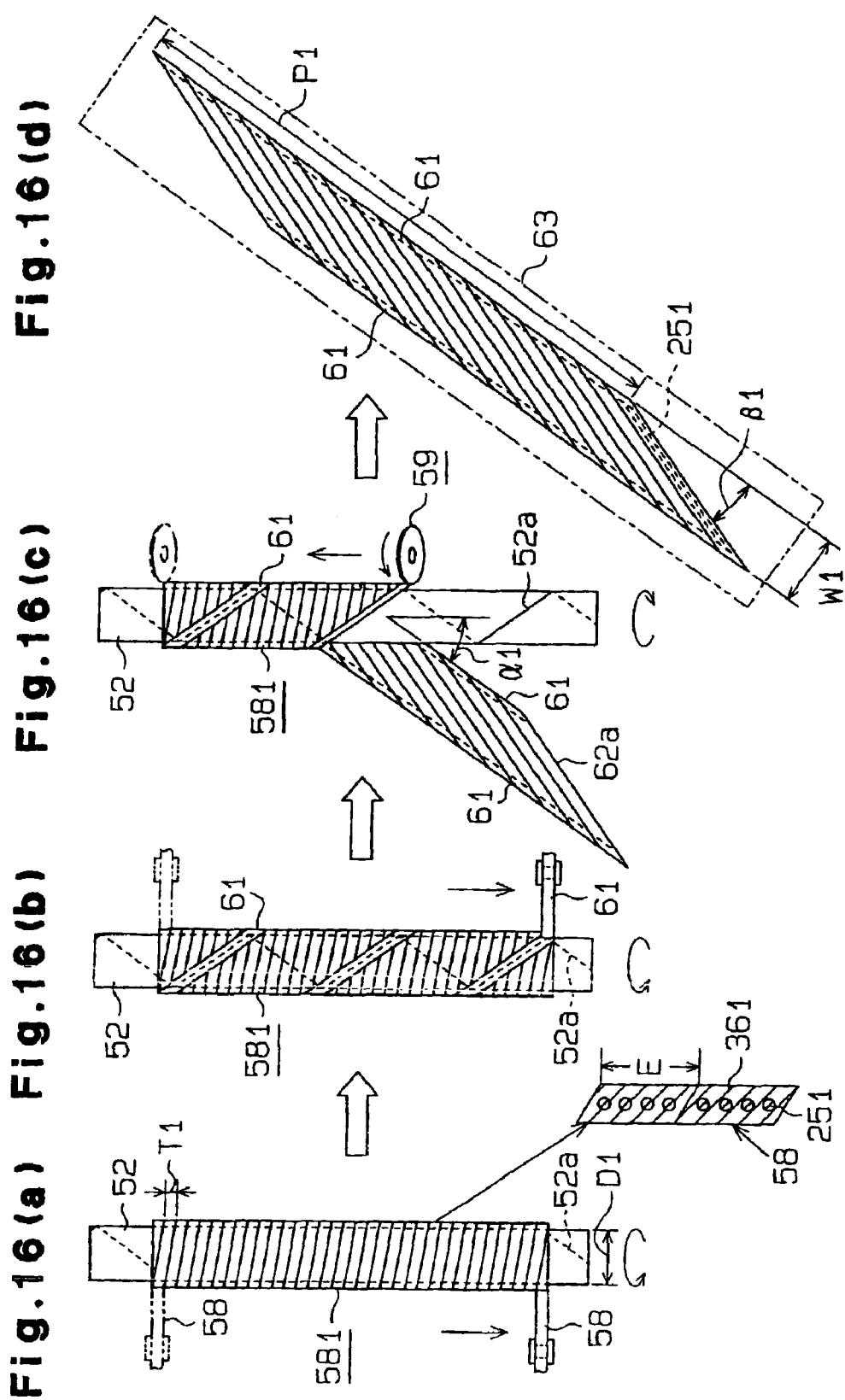

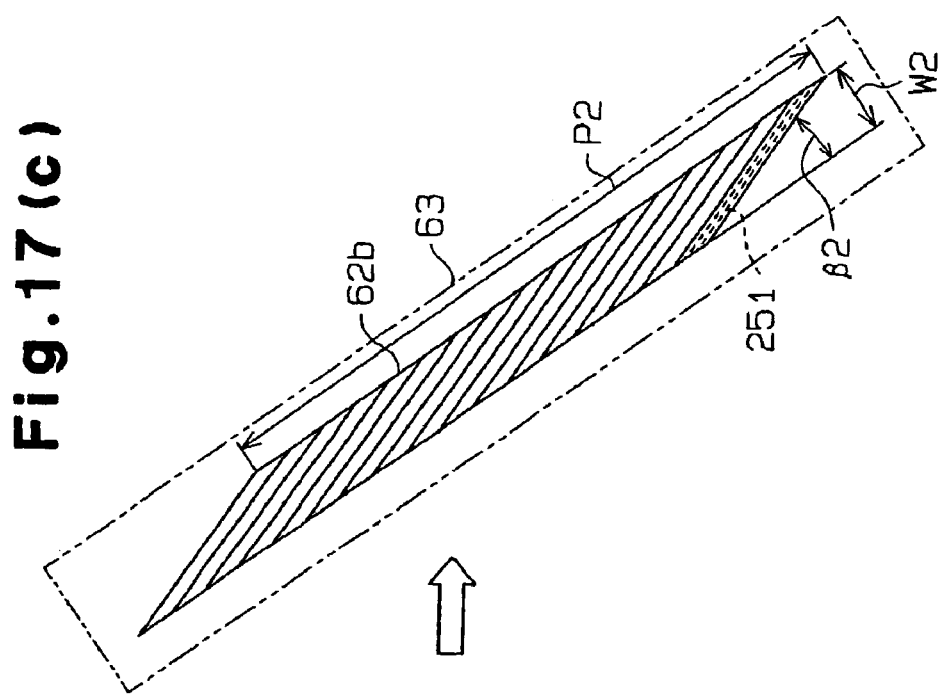
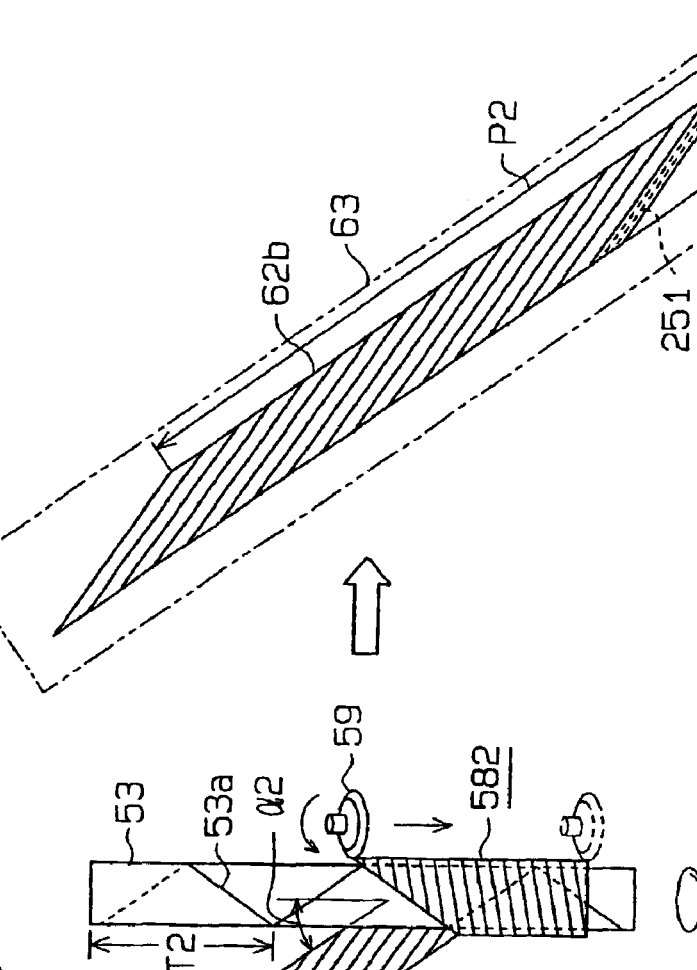
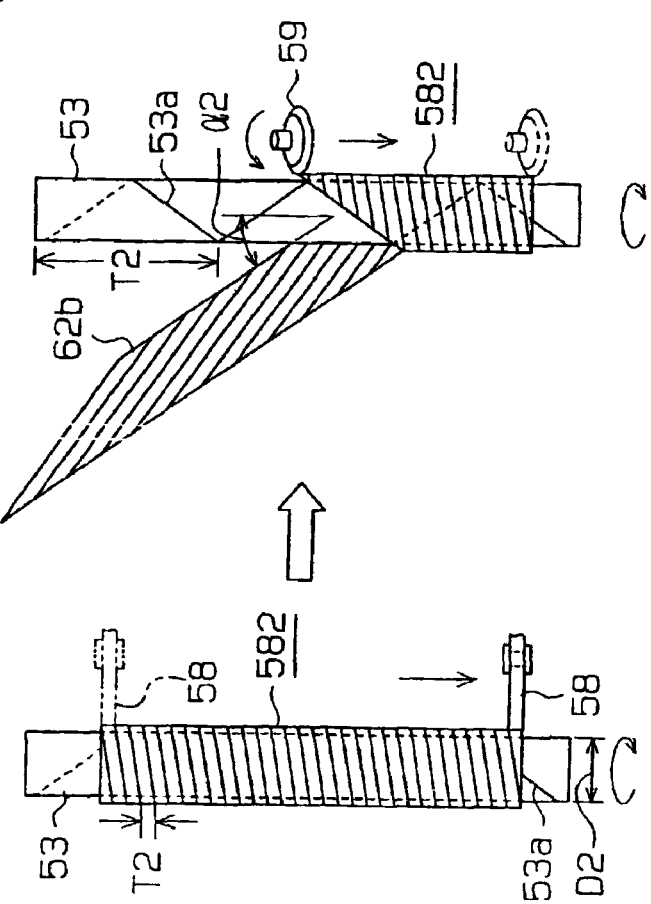

SYSTEM AND METHOD FOR PRODUCING TIRE

The present invention relates to a system and a method for producing a tire such as a pneumatic radial tire.

BACKGROUND OF THE INVENTION

There are known such systems for producing pneumatic radial tires as disclosed in Japanese Examined Patent Publication No. Sho 60-59856, Japanese Examined Patent Publication No. Sho 62-35381, and Japanese Unexamined Patent Publication No. Hei 2-25321, for example. The conventional systems have a station for forming an inner lining element of rubber chafers, a body ply or body plies, and beads, a station for forming an outer lining element of a base tread, a cap tread, and belts, a station for forming a green tire of the inner lining element and the outer lining element, and a vulcanizing station comprising a plurality of vulcanizers. These stations are disposed independently in a scattered pattern in the plant. Between these stations, there are disposed a plurality of feeding apparatus including manually operated carriage vehicles for feeding inner lining elements, outer lining elements, and green tires formed in the respective stations to next stations partly automatically, with operators' manual transporting actions involved in the overall feeding process.

In each of the above conventional tire production systems, body plies and belts separately produced in the plant and kept in stock are supplied to the station for forming inner lining elements and to the station for forming outer lining elements. The tire production system not only takes up a very wide space, but also makes for little efficiency to produce tires for the reasons described below.

Heretofore, tires have been manufactured on a mass-production basis. For example, body plies and belts are produced by continuously forming a wide and long sheet made up of a number of cords coated with rubber, cutting the sheet into a number of pieces of given dimensions, connecting the pieces into strips, winding the strips, and storing them as body plies and belts. The body plies and belts in stock are then delivered to a next process.

The above tire mass-production system appears to lend itself to efficient tire production. However, it requires not only large-scale facilities for producing the sheet, cutting the sheet into pieces, and winding the cut pieces, but also a large space for storing the sheet. As a result, the plant incorporating the tire mass-production system needs a large space and huge energy for its operation. Therefore, though the plant is designed for the tire mass-producing system, it costs too much to produce tires by the system and can not enjoy the advantages of mass production. Particularly, if the plant for producing tire components such as body plies and belts and the plant for forming tires are separate from each other due to geographic limitations, then it is difficult to reduce the overall cost of the tires because the cost of keeping the tire components in stock and the cost of conveying the tire components represent large proportions in the overall cost. Since the process of keeping the tire components in stock and the process of conveying the tire components are required to be performed between other tire producing processes, it is difficult to perform various quality control processes for protecting tire components against humidity, preventing sheet surfaces from becoming hardening, and keeping sheet surface clean. Thus, the failure to achieve desired quality control levels results in a low yield of tire products and a poor tire quality at the same time, disadvantageously.

The present invention has been made in view of the above problems with the conventional tire mass-production systems. It is a primary object of the present invention to provide a system for producing tires to increase productivity and quality without requiring a wide space in the plant.

Another object of the present invention is to provide a method of producing good quality tires at a low cost.

BRIEF SUMMARY OF THE INVENTION

To achieve the above object, there is provided in accordance with an aspect of the present invention a system for producing a green tire by individually manufacturing an inner lining element and an outer lining element and putting the outer lining element on an outer circumference of the inner lining element. The system includes a first apparatus group for manufacturing the inner lining element using a first ribbon of rubberized cord fabric, a second apparatus group for manufacturing the outer lining element using a second ribbon of rubbersied cord fabric, a third apparatus group for forming a green tire by putting the outer lining element on the inner lining element, and a fourth apparatus group including at least one vulcanizer for vulcanizing the green tire into a vulcanized tire.

According to another aspect of the present invention, there is also provided a method of producing a tire. The method includes the first step of winding a first ribbon of rubberized cord fabric around a drum, thereafter cutting off a ribbon cylinder into body ply materials, and winding or fitting the body ply materials, a band, and beads around a band forming drum to form an inner lining element, the second step, concurrent with the first step, of winding a second ribbon composed of filamentary cords covered with rubber around drums, thereafter helically cutting off a ribbon cylinder into belt materials, and winding the belt materials and treads around an outer lining element forming drum to form an outer lining element, the third step of inserting the inner lining element into a shaping drum, inflating the inner lining element, putting the outer lining element on the inner lining element, inflating the inner lining element to form a green tire which substantially has a final tire shape, and the fourth step of vulcanizing the rubber component of the green tire formed in the third step

BRIEF DESCRIPTION OF THE DRAWINGS

FIGS. 16(a), 16(b), 16(c), and 16(d) are views illustrative of a process of manufacturing a belt material;

FIGS. 17(a), 17(b), and 17(c) are views illustrative of a process of manufacturing a belt material;

DETAILED DESCRIPTION OF THE PREFERRED EMBODIMENTS

An embodiment of the present invention will be described in detail below with reference to FIGS. 1 through 19.
Outline of Production System An outline of the production system for producing a pneumatic radial tire according to the present embodiment will first be described below.

Figure 1:
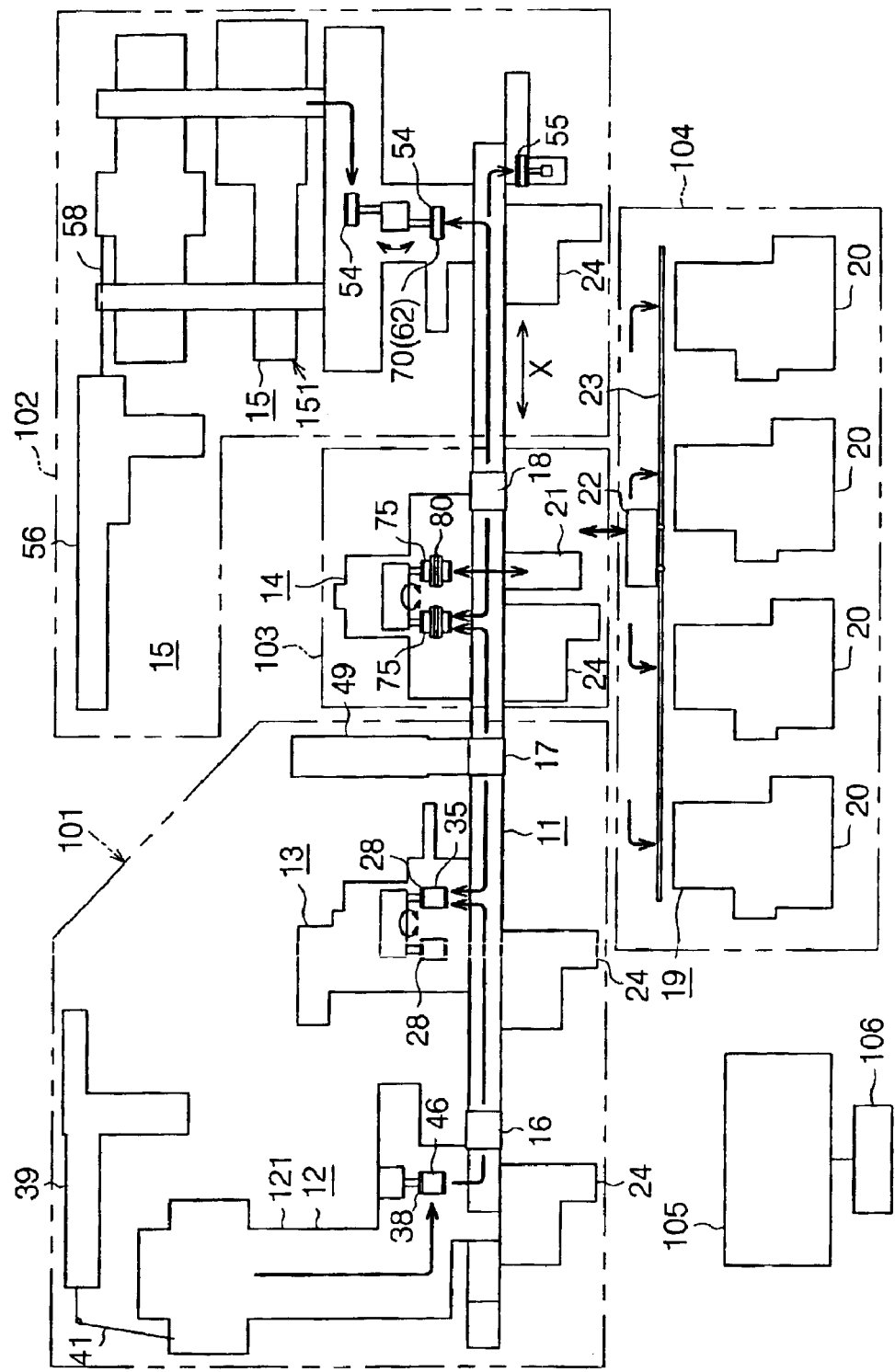
FIG. 1 is a schematic block diagram of a production system for producing a pneumatic radial tire according to an embodiment of the present invention.

As shown in the schematic plan view of FIG. 1, the production system has a first apparatus group 101 for manufacturing an inner lining element including a body ply 46 using a first ribbon 41 of rubberized cord fabric, and a second apparatus group 102 for manufacturing an outer lining element including belts and a tread using a second ribbon 58 of rubberized cord fabric. The production system also has a third apparatus group 103 for forming a green tire by putting an outer lining element on an inner lining element, and a fourth apparatus group 104 for vulcanizing the green tire into a vulcanized tire. The production system further includes a control apparatus 105 for controlling various operation modes of the first through fourth apparatus groups 101 through 104.

A single conveyor line 11 is linearly laid on the floor of a plant to interconnect the first through third apparatus groups 101 through 103. On one side of the conveyor line 11, there are disposed in order a ply station 12 for forming a body ply or body plies and a band station 13 for forming an inner lining element of rubber chafers, a body ply or body plies, and beads, the ply station 12 and the band station 13 belonging to the first apparatus group 101, a shaping station 14 for forming a green tire of an inner lining element and an outer lining element, the shaping station 14 belonging to the third apparatus group 103, and a belt-tread station 15 for forming the outer lining element, the belt-tread station 15 belonging to the second apparatus group 102.

The first feeding apparatus 16 for feeding a body ply or body plies from the ply station 12 to the band station 13 is movably supported at one end of the conveyor line 11. The second feeding apparatus 17 for setting beads in the band station 13 and feeding an inner lining element from the band station 13 to the shaping station 14 is movably supported in an intermediate region of the conveyor line 11. The third feeding apparatus 18 for feeding an outer lining element from the belt-tread station 15 to the shaping station 14 is movably supported at the other end of the conveyor line 11.

The first through third apparatus groups 101 through 103 are disposed on a first side of the conveyor line 11. A vulcanizing station 19 comprising a plurality of vulcanizers 20 is disposed on a second side of the conveyor line 11 which is opposite to the first side thereof. Between the conveyor line 11 and the vulcanizing station 19, there is disposed a transfer apparatus 21 in a position corresponding to the shaping station 14, and a delivery apparatus 22 in a position corresponding to the vulcanizing station 19 for movement along a delivery line 23. After a green tire formed in the shaping station 14 is transferred to the transfer apparatus 21, the green tire is received by a mold release agent spray (not shown), and then turned 90° in a horizontal plane and transferred to the delivery apparatus 22 while an internal pressure is being applied to the green tire. The green tire is then delivered by the delivery apparatus 22 to the vulcanizers 20 of the vulcanizing station 19. The mold release agent spray, which is not shown, applies mold release agent to the inner surface of the tire so that the tire inner surface does not tightly contact the vulcanizing bladder after vulcanization.

Drum exchanging apparatus 24 are disposed on the second side of the conveyor line 11 at respective positions corresponding to the ply station 12, the band station 13, the shaping station 14, and the belt-tread station 15. For changing tire sizes, the drum exchanging apparatus 24 exchange forming drums 38, 28, shaping drums 75, and outer lining element forming drums 54 which are used in the stations 12 through 15 with drums of different dimensions. Although not shown, each of the drums 38, 28, 75, 54 in the stations 12 through 15 has a taper shaft, a mechanism for preventing the taper shaft from being released, and a mechanism for preventing the taper shaft from being relatively turned, to allow the drum exchanging apparatus 24 to exchange drums in a very short period of time. Automatic drum exchanging apparatus may alternatively be employed.

Each of the first through third feeding apparatus 16 through 18 has a pallet (not shown) for gripping an intermediate tire product. For changing tire dimensions by inches, the pallet is replaced with a pallet having a different size by the operator before or after drums are exchanged by the drum exchanging apparatus 24. Automatic pallet exchanging apparatus may alternatively be employed.

Details of the first through fourth apparatus groups 101 through 104 will be described below in relation to their actual operation.
First Apparatus Group 101

First, the first apparatus group 101 will be described below with reference to FIGS. 1 through 3 and FIGS. 6 through 13.

Figure 3:
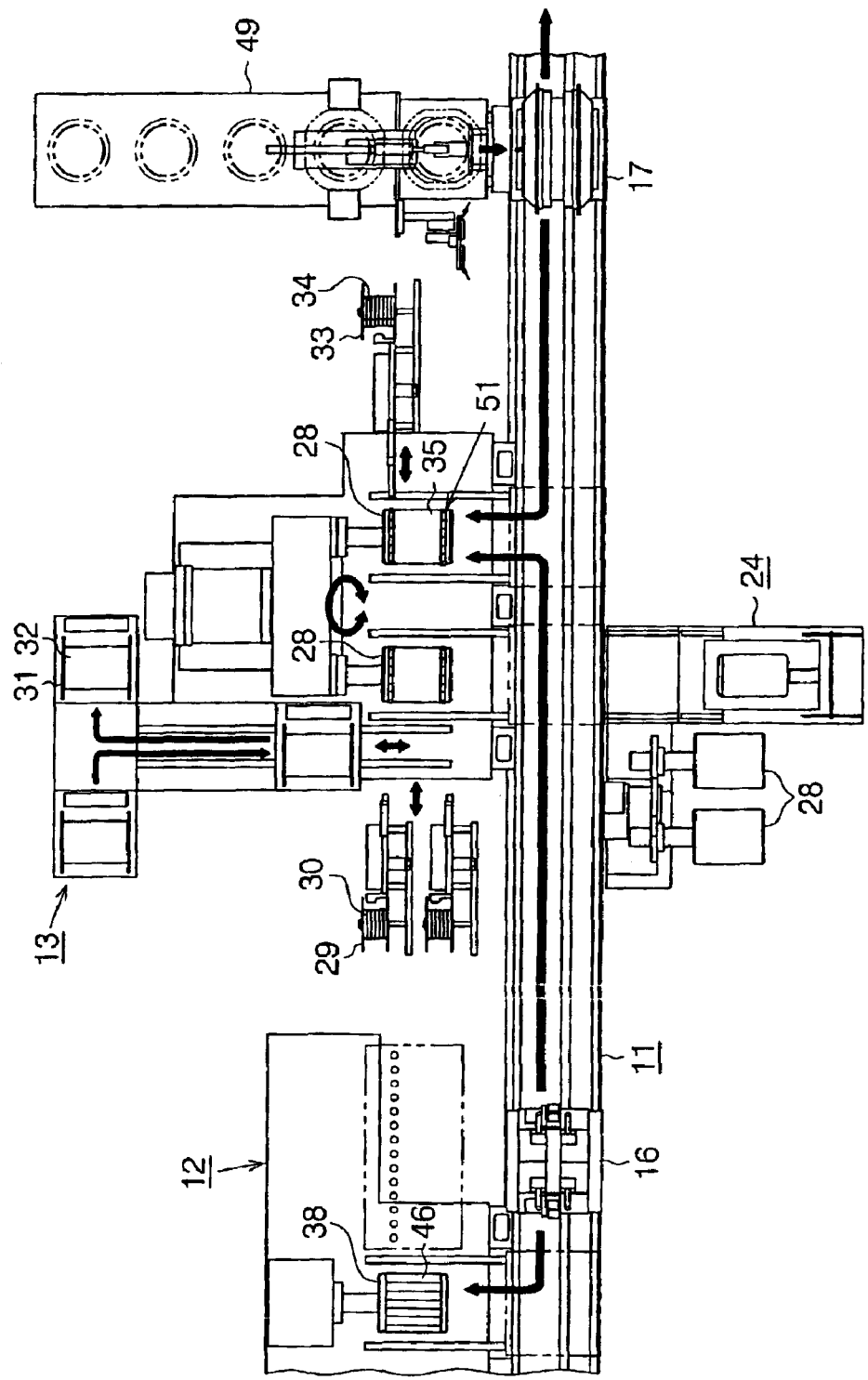
FIG. 3 is a plan view of a major part of the band station shown in FIG. 1.
Figure 6:
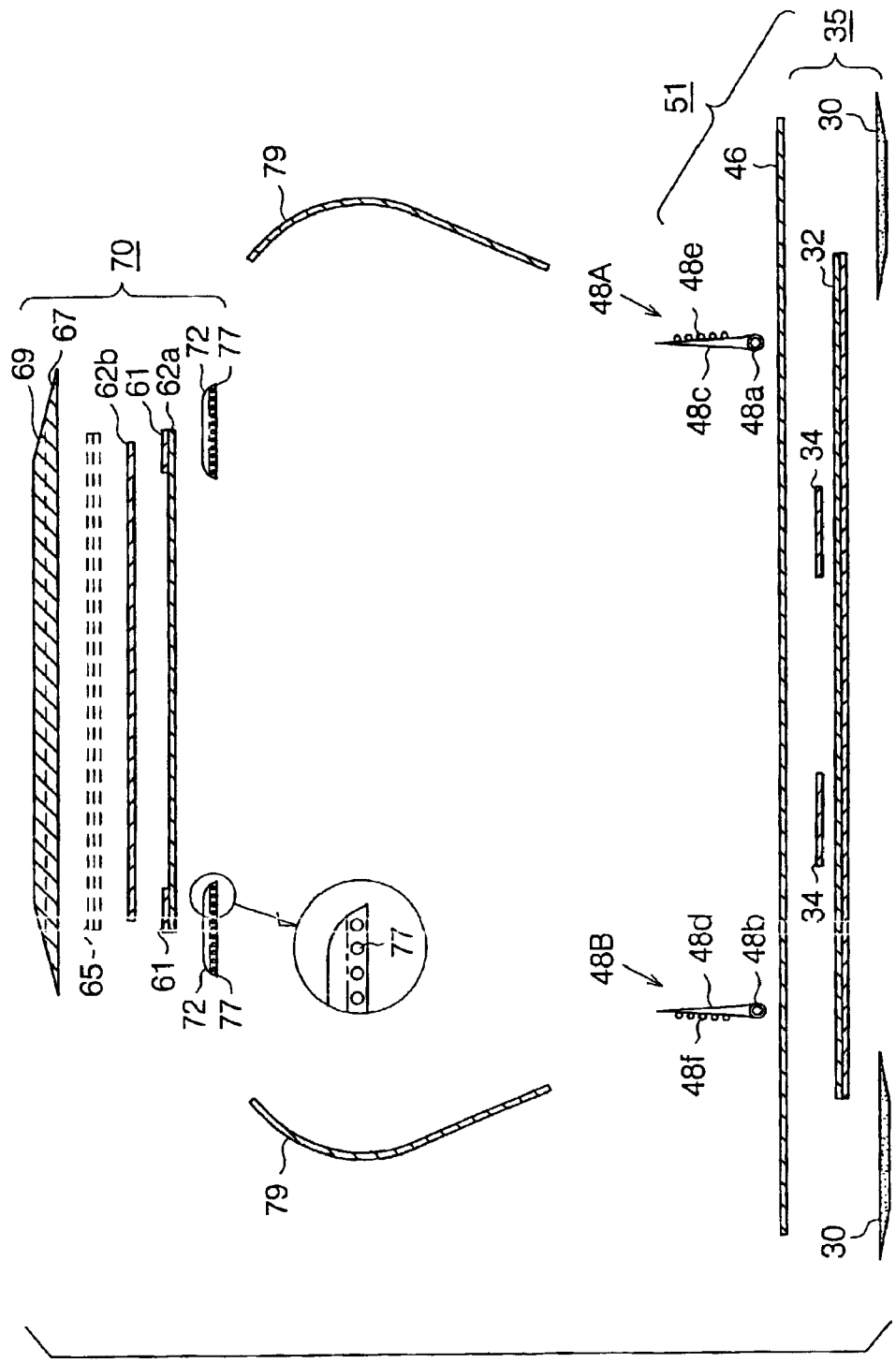
FIG. 6 is an exploded cross-sectional view showing intermediate tire components for use in a radial tire to be produced by the production system shown in FIG. 1.

As shown in FIGS. 1, 3, and 6, the band station 13 has band forming drums 28. Each of the band forming drums 28 has a diameter slightly smaller than a designed tire dimension. Rubber chafers 30 supplied from adjacent rubber chafer stock reels 29 are wound in a single layer on the band forming drum 28, and an inner liner 32 supplied from an adjacent inner liner stock reel 31 is wound in a plurality of layers, e.g., three layers, on the layer of the rubber chafers 30. Thereafter, the band forming drum 28 is turned 180° to an opposite position (the right-hand position in FIG. 3), and then liner pads 34 supplied from liner pad stock reels 33 are wound in a single layer on the layers of the inner liner 32, thus forming a band 35.

Figure 2:
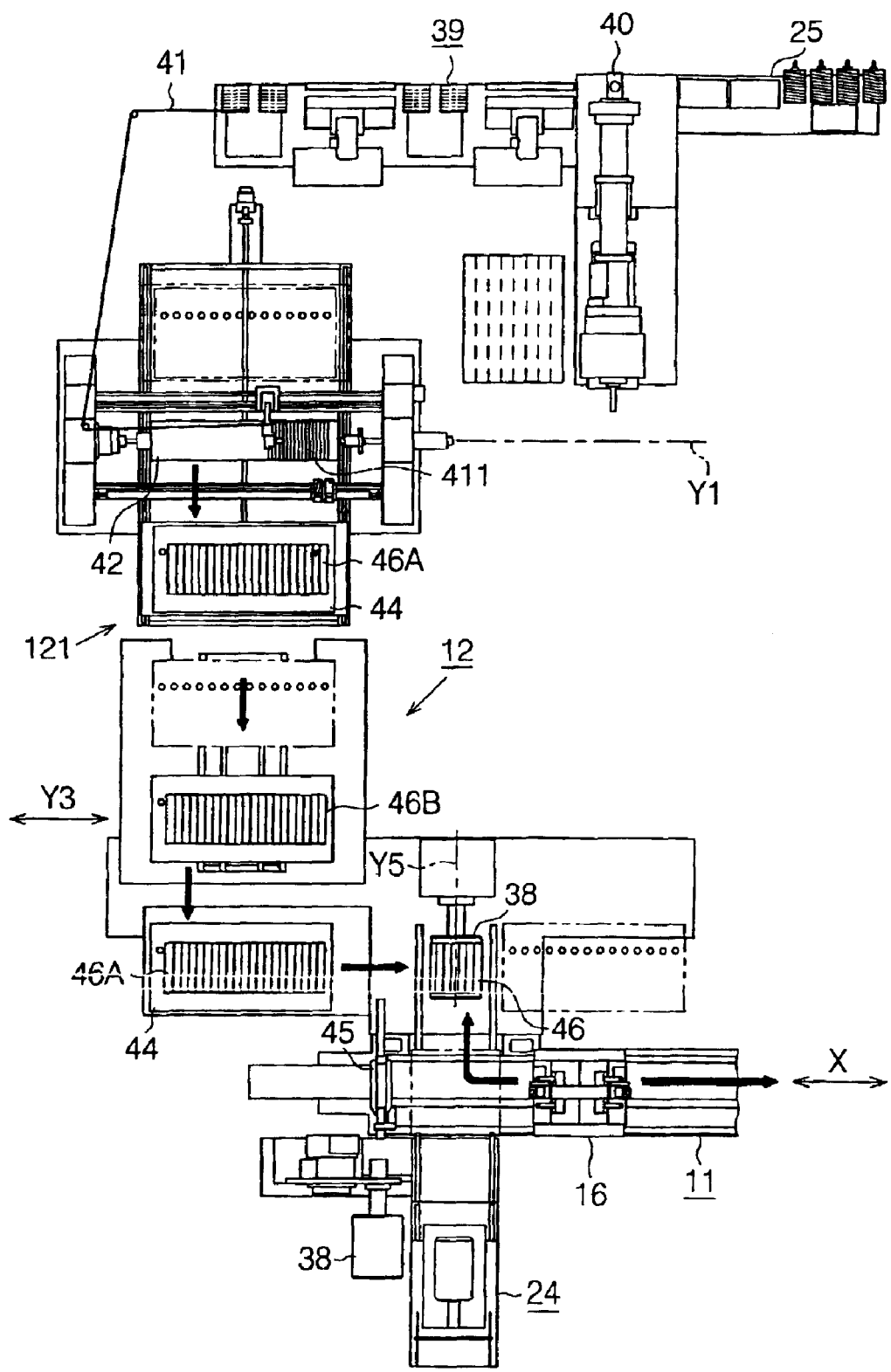
FIG. 2 is a plan view of a major part of the ply station shown in FIG. 1.

As shown in FIGS. 1, 2, and 6, the ply station 12 has a body ply forming drum 38 for forming a body ply 46 concurrent with the formation of the band 35 in the band station 13.

Figure 7A:
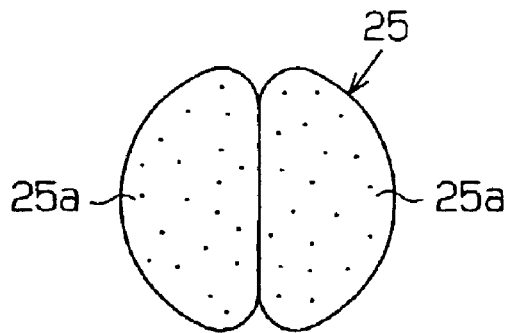
FIGS. 7(a) and 7(b) are cross-sectional views illustrative of a process of forming adhesive thin layer on a filamentary cord.
Figure 7B:
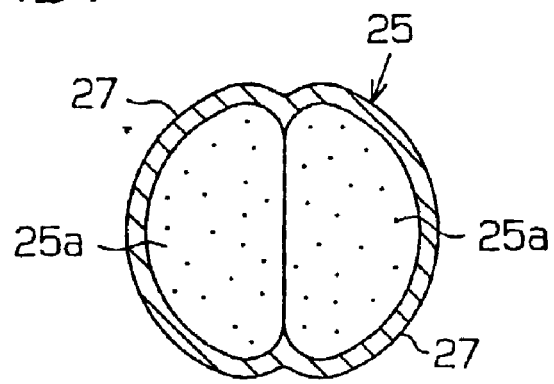

In the ply station 12, a ribbon-like rubber-coated cord 41 (hereinafter simply referred to as "first ribbon 41") is formed by a rubber extruder on cord fabrics cord extruding line 39. Specifically, as shown in FIG. 7(a), a cord 25 in the form of bundles of two groups of polyethylene terephthalate fibers (for example, 1000 D/2, D represents denier, or a unit of the size of a thread) is passed through a tank (not shown) of a dipping solution (liquid that contains an adhesive aid for adhering rubber to cords), forming a layer 27 around the cord 25, as shown in FIG. 7(b). A plurality of such cords 25 are then put side by side and passed through a rubber extruder 40 shown in FIG. 2 to coat the cords 25 with a flat body of rubber 36, thus forming the first ribbon 41. The first ribbon 41 has a width of E ranging from 3 to 30 mm, preferably from 5 to 15 mm.

Figure 9A:
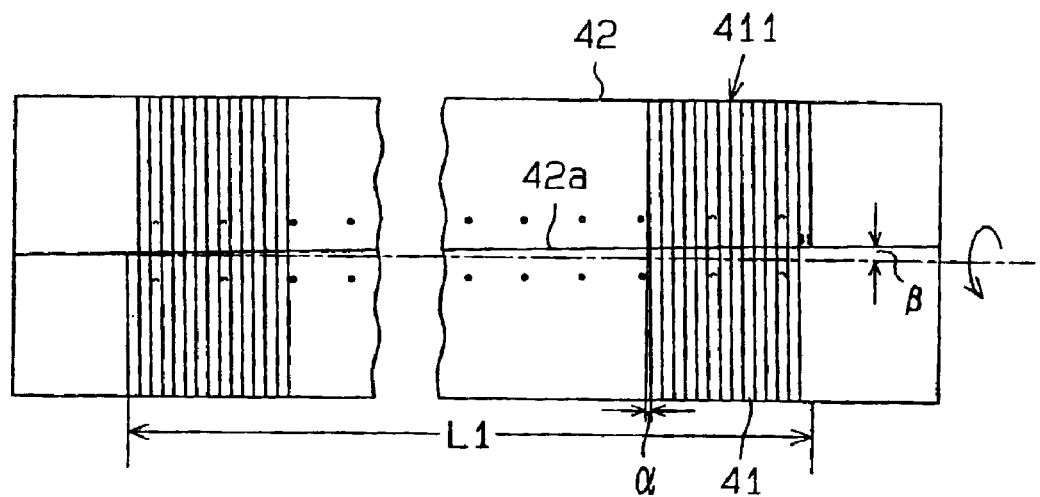
FIGS. 9(a) and 9(b) are fragmentary front-elevational views illustrative of a process of forming a ribbon cylinder by winding a ribbon on a drum.
Figure 10:
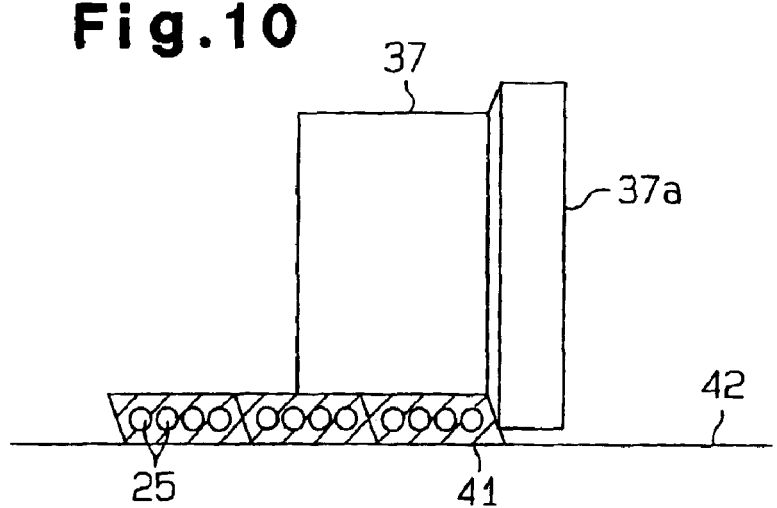
FIG. 10 is a partly cross-sectional view illustrative of a process of winding the ribbon on the drum.

The first ribbon 41 is then wound around helically and held in close contact with the upper one of a pair of drums 42 rotatably supported on respective upper and lower shafts, as shown in FIG. 9(a), forming a ribbon cylinder 411. At this time, as shown in FIG. 10, a presser roller 37 presses a turn of the first ribbon 41, thereby bringing the turn into intimate contact with the adjacent turn of the first ribbon 41. The first ribbon 41 has a transverse cross-sectional shape of parallelogram which allows the adjacent turns of the first ribbon 41 to be reliably brought into intimate contact with each other. The presser roller 37 has a guide 37a which has such a diameter as to provide a small gap between the guide 37a and the drum 42, so that the adjacent turns of the first ribbon 41 on the drum 42 are prevented from being displaced sideways, but are strongly kept in intimate contact with each other.

Figure 11:
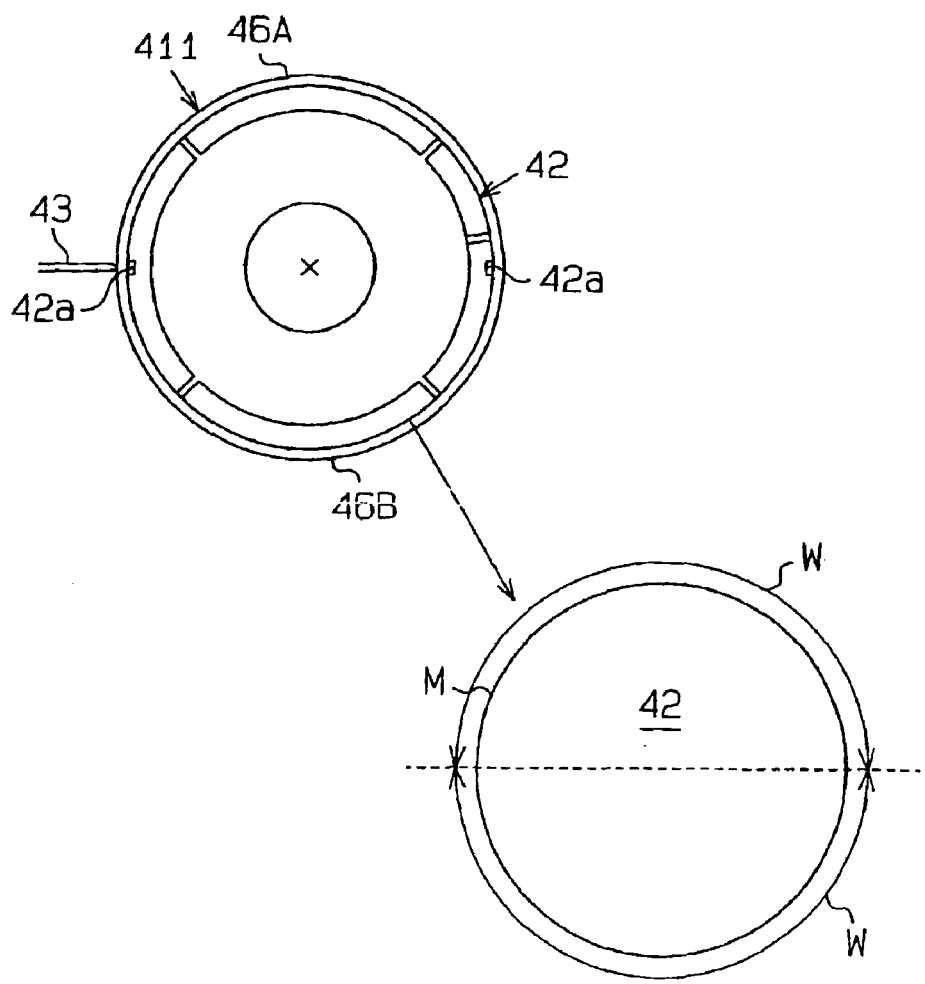
FIG. 11 is a side elevational view illustrative of a process of cutting off the ribbon cylinder on the drum.

The drum 42 with the ribbon cylinder 411 formed thereon is angularly moved from an upper position to a lower position by a reversing mechanism. As shown in FIG. 11, the ribbon cylinder 411 on the drum 42 is cut off along one of cutter clearance grooves 42a in the drum 42 by a cutter 43. Thereafter, the drum 42 is turned 180° about its own axis, and the cutter 43 is moved along the other cutter clearance groove 42a to cut off the ribbon cylinder 411. In this manner, two body ply materials 46A, 46B are produced on the single drum 42.

As shown in FIG. 9(a), the first ribbon 41 is wound around the drum 42 at a winding angle $\alpha$. The cutter clearance grooves 42a are defined along a gradual curve inclined at a helicoidal angle $\beta$ to the axis of the drum 42. The helicoidal angle $\beta$ is the same as the winding angle $\alpha$, thus allowing the cut surface of the first ribbon 41 to extend perpendicularly in the longitudinal direction of the first ribbon 41. The angles $\alpha$, $\beta$ are set to a value in the range from 0.5 to 5.0 degrees.

Figure 12:
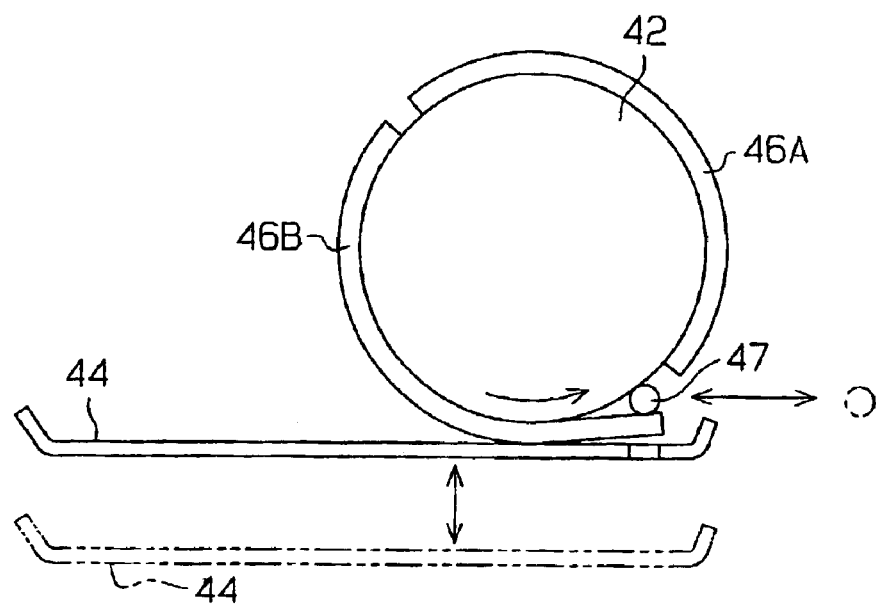
FIG. 12 is a side elevational view illustrative of a process of peeling the ribbon off the drum.
Figure 13:
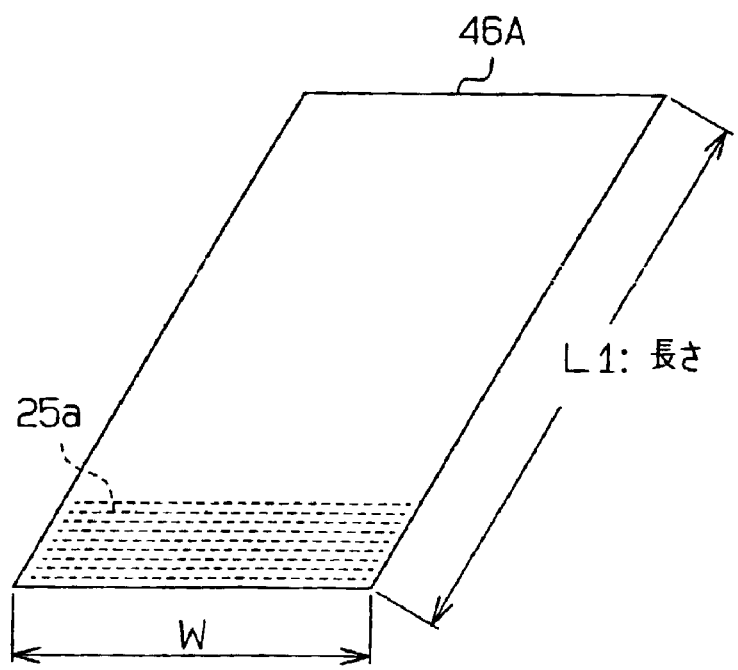
FIG. 13 is a developed perspective view of a body ply material.

As shown in FIG. 12, the body ply materials 46A, 46B are peeled off the drum 42 one by one by a peeling bar 47, and accurately transferred onto a tray 44 that is positioned below the drum 42. As shown in FIG. 13, the body ply 46A (46B) has a predetermined width W and a predetermined length L which are adequate for one tire. Thereafter, the tray 44 is moved to a position below the body ply forming drum 38, and then lifted to bring the body ply material 46A into intimate contact with the outer circumferential surface of the body ply forming drum 38. The body ply forming drum 38 is rotated and the tray 44 is moved forward, thus winding the body ply material 46A around the body ply forming drum 38.

Figure 9B:
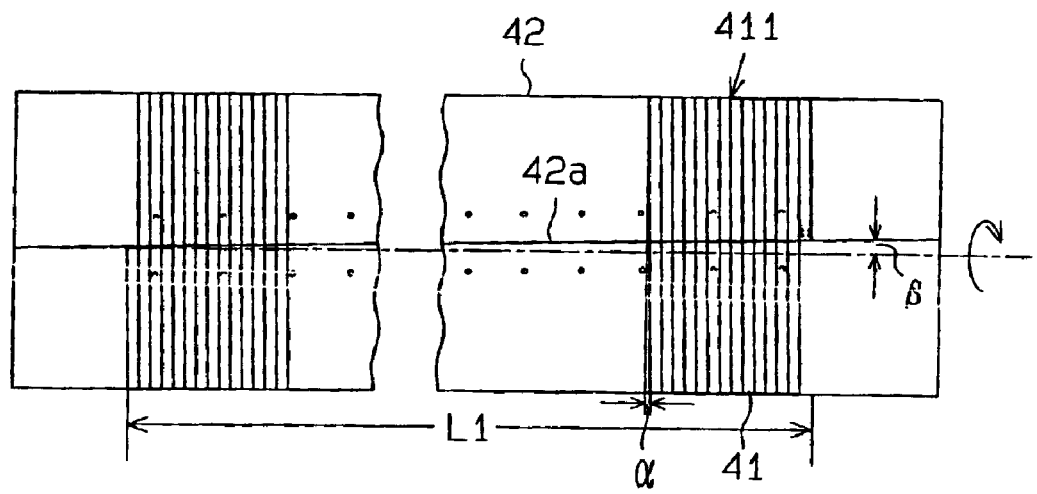

As shown in FIG. 9(b), a ribbon 41 is wound on the other drum 42 in the upper position, forming a ribbon cylinder 411 thereon. The other drum 42 is then displaced to the lower position, after which the ribbon cylinder 411 is cut off into body ply materials 46A, 46B, the body ply materials 46A, 46B, are peeled off, and accurately transferred onto a tray 44 without displacement.

In FIG. 2, the body ply material 46A which has been fed to a position corresponding to the body ply forming drum 38 has its starting and terminal ends joined to each other by an end joining apparatus 45, thus forming a body ply 46. The body ply forming drum 38 has its outside diameter expandable and contractible and has an open groove defined in an outer circumferential surface thereof and extending in its longitudinal direction. With the body ply material 46A wound around the body ply forming drum 38 with the starting and terminal ends positioned over the open groove, the end joining apparatus 45 is moved along the open groove to adjust the gap between starting and terminal ends to a constant interval, and thereafter joins the ends of the body ply material 46A. The emptied tray 44 is automatically returned to its original position and waits in the original position to receive the next body ply material 46B.

Thereafter, in FIGS. 2 and 3, the first feeding apparatus 16 is moved forward to a position corresponding to the body ply forming drum 38, and the diameter of the body ply forming drum 38 is contracted. Then, the first feeding apparatus 16 removes the body ply 46 from the body ply forming drum 38, and sucks in and grips the body ply 46. The first feeding apparatus 16 is moved to the right along the conveyor line 11 to convey the body ply 46 to a position corresponding to the right band forming drum 28 in the band station 13. In this position, the first feeding apparatus 16 moves forward to the band forming drum 28, and the diameter of the band forming drum 28 is expanded to bring the body ply 46 into intimate contact with the outer circumference of the band 35 on the band forming drum 28. After having fed the body ply 46, the first feeding apparatus 16 is automatically returned to its original position and waits in the original position.

Then, as shown in FIGS. 3 and 6, beads 48A, 48B are set on the band 35 and the body ply 46 on the band forming drum 28. The beads 48A, 48B comprise respective bead wires 48a, 48b, respective fillers 48c, 48d, and respective bead insert plies 48e, 48f. The beads 48A, 48B are set as follows: The band station 13 has a bead stock unit 49 where right beads 48A and left beads 48B are alternately stacked with spacers interposed therebetween. After the lowest right bead 48A and the associated spacer are removed from the bead stock unit 49; only the right bead 48A is transferred to a bead setter in an iterior side of the second feeding apparatus 17. The remaining spacer is automatically stocked in a spacer stock unit. The second left bead 48B is transferred to a bead setter on a front side of the second feeding apparatus 17 in the same manner as with the right bead 48A. The remaining spacer is automatically stocked in a spacer stock unit. The second feeding apparatus 17 is moved to the left along the feed line 11 while gripping the beads 48A, 48B in the respective bead setters, as shown in FIG. 3. The diameter of the band forming drum 28 is expanded to combine the beads 48A, 48B integrally with the band 35 and the body ply 46, thus forming an inner lining element 51.

Thereafter, the diameter of the band forming drum 28 is contracted to remove the inner lining element 51 therefrom. The second feeding apparatus 17 is then moved to the right along the feed line 11, feeding the inner lining element 51 to a position corresponding to a shaping drum 75 of the shaping station 14, and fits the inner lining element 51 over the shaping drum 75. In FIG. 2, an apparatus for manufacturing the body ply material 46A is represented by the reference numeral 121.

Second Apparatus Group 102

The second apparatus group 102 will be described below with reference to FIGS. 1, 5, 6, 14 through 18.

Figure 5:
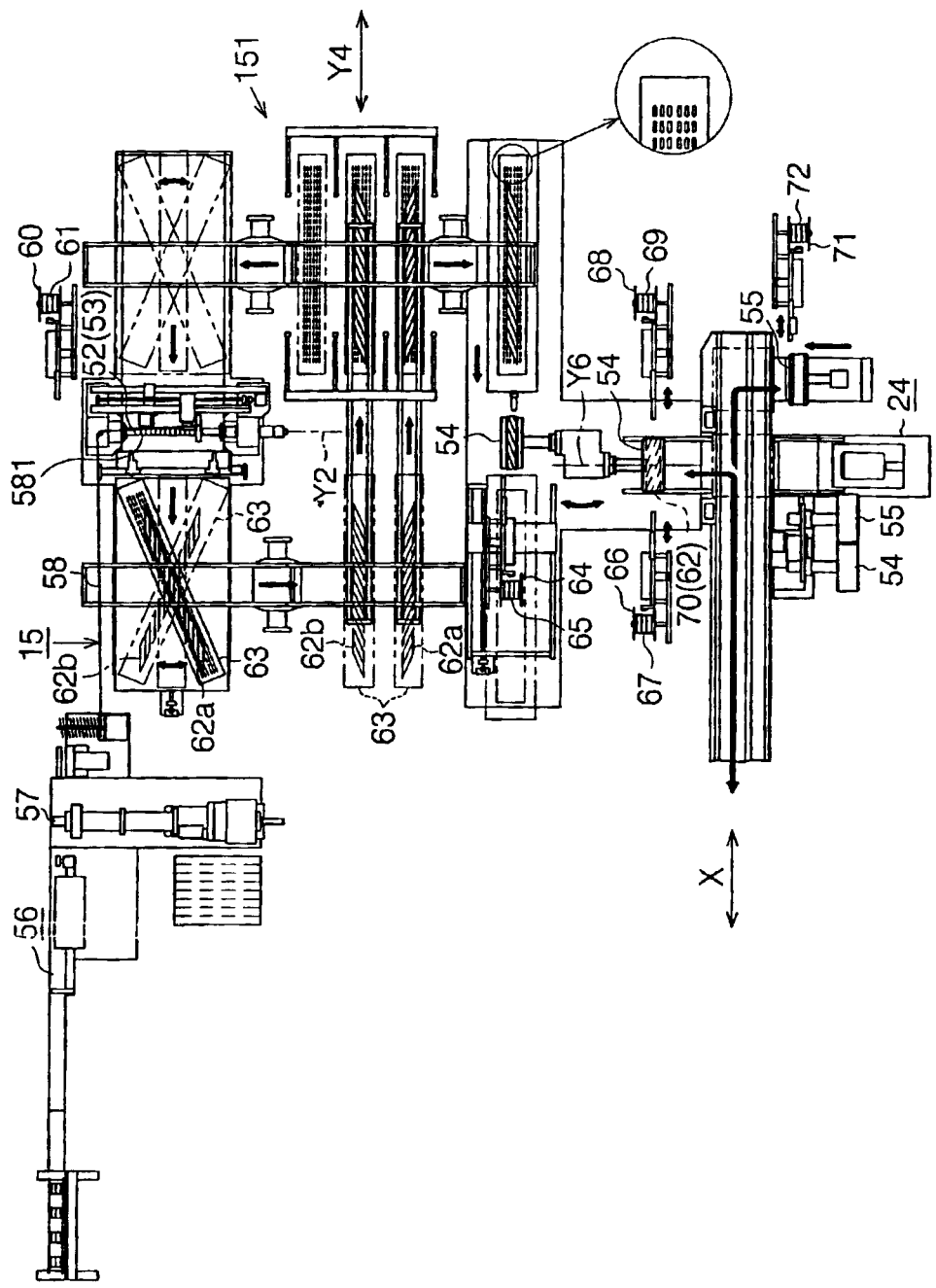
FIG. 5 is a plan view of a major part of the belt-tread station shown in FIG. 1.

As shown in FIGS. 1, 5, the belt-tread station 15 has a drum 54 for forming an outer lining element and a drum 55 for winding belt under-cushion rubber layers. The belt-tread station 15 forms an outer lining element 70 concurrent with the formation of the inner lining element 51 in the band station 13 and the delivery of the inner lining element 51 to the shaping station 14.

Figure 14A:
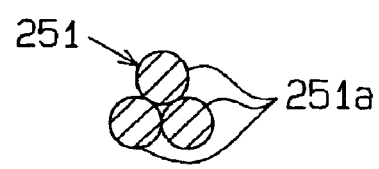
FIGS. 14(a), 14(b), and 14(c) are cross-sectional views illustrative of a process of forming a thin rubber layer on filaments of cord.
Figure 14B:
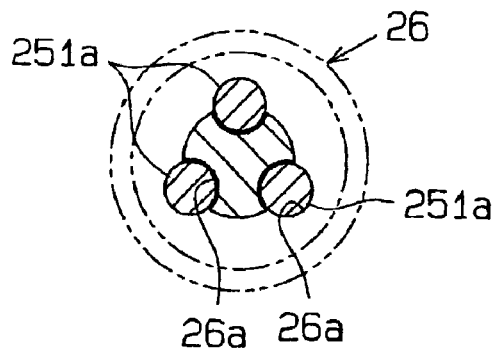
Figure 14C:
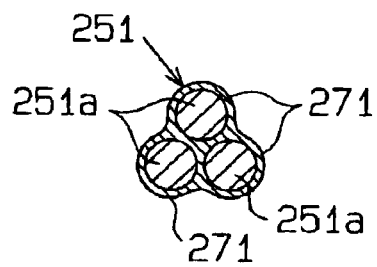
Figure 15:
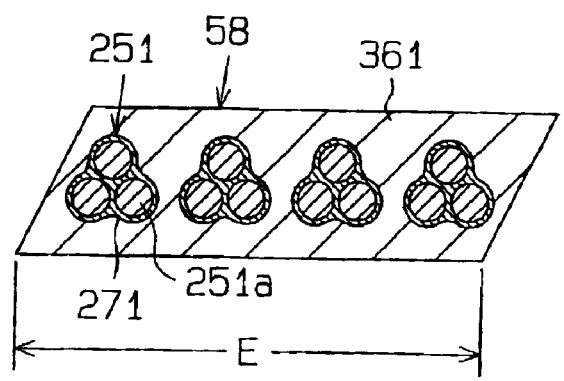
FIG. 15 is an enlarged transverse cross-sectional view of a ribbon.

In the belt-tread station 15, a ribbon-like rubber-coated cord 58 (hereinafter simply referred to as "second ribbon 58") is formed by a rubber extruder 57 on a ribbon-like rubber-coated cord extruding line 56, in the same manner as with the above process of manufacturing the first ribbon 41. A cord 251 for use in the second ribbon 58 is manufactured in advance as follows: As shown in FIG. 14(a), a cord 251 in the form of a strand of twisted filaments 251a comprising plated metal wires is passed through separation holes 26a of an untwister 26 shown in FIG. 14(b), and fed longitudinally. The filaments 251a are untwisted, with gaps formed therebetween. The cord 251 is passed through the solution tank (not shown) of dissolved compound rubber, forming a thin rubber layer 271 around each of the filaments 251a, as shown in FIG. 14(c). The filaments 251a are then twisted on their own accord back to a substantially original twisted state thereof. Thereafter, a plurality of such cords 251 are then stranded and passed through the rubber extruder 57 shown in FIG. 5 to coat the cords 251 on the thin rubber layers 271 of a flat body of rubber 361, thus forming the second ribbon 58, as shown in FIG. 15. The second ribbon 58 has a width ranging from 3 to 30 mm, preferably from 5 to 15 mm.

The second ribbon 58 is then wound around and held in close contact with an upper larger-diameter one of a pair of drums 52, 53 rotatably supported on respective upper and lower shafts, as shown in FIG. 16(a), forming a ribbon cylinder 581. The drums 52, 53 have different outside diameters D1, D2, respectively, and have respective helical cutter clearance grooves 52a, 53a defined in respective outer circumferential surfaces thereof and extending in opposite directions. The cutter clearance grooves 52a, 53a have respective helicoidal angles $\alpha 1$, $\alpha 2$ set to an angle, e.g., of 40° in an angular range from 30 to 60°.

The drum 52 on which the ribbon cylinder 581 formed thereon is reversed from an upper position to a lower position by a reversing mechanism. A belt edge rubber strip 61 supplied from a belt edge rubber strip stock reel 60 is applied to the outer circumferential surface of the ribbon cylinder 581 on the drum 52 along the helical cutter clearance groove 52a, as shown in FIG. 16(b).

As shown in FIG. 16(c), the ribbon cylinder 581 and the belt edge rubber strip 61 are cut off along the helical cutter clearance groove 52a by a cutter 59, thus forming a wide first belt material 62a. The first belt material 62a is peeled off the drum 52, and accurately transferred onto a tray 63 positioned below the drum 52, as shown in FIG. 16(d).

Thereafter, the tray 63 is moved to a position below the outer lining element forming drum 54, and lifted to bring the first belt material 62a on the tray 63 into intimate contact with the outer circumference of the outer lining element forming drum 54. Then, the outer lining element forming drum 54 is rotated and the tray 63 is moved forward to wind the first belt material 62a around the outer lining element forming drum 54. The emptied tray 63 is returned to a given position near the drum 52, and waits in that position.

Figure 18:
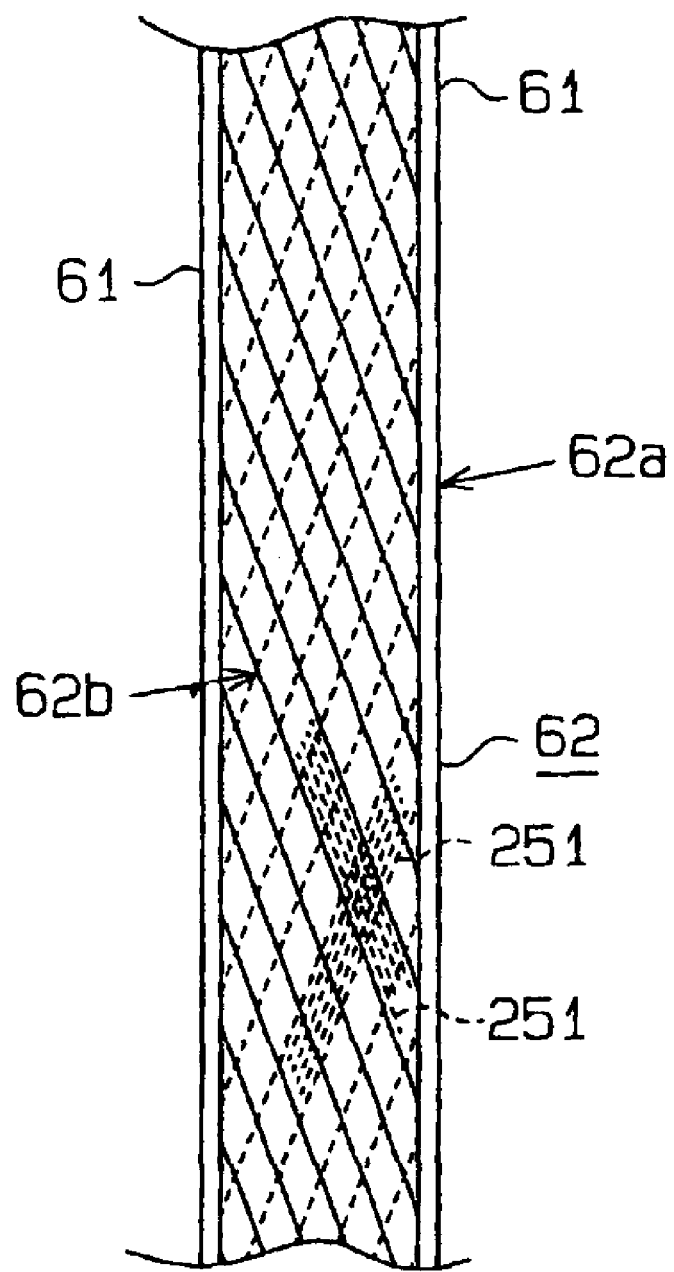
FIG. 18 is a partially enlarged explanatory view of belts.
Figure 19:
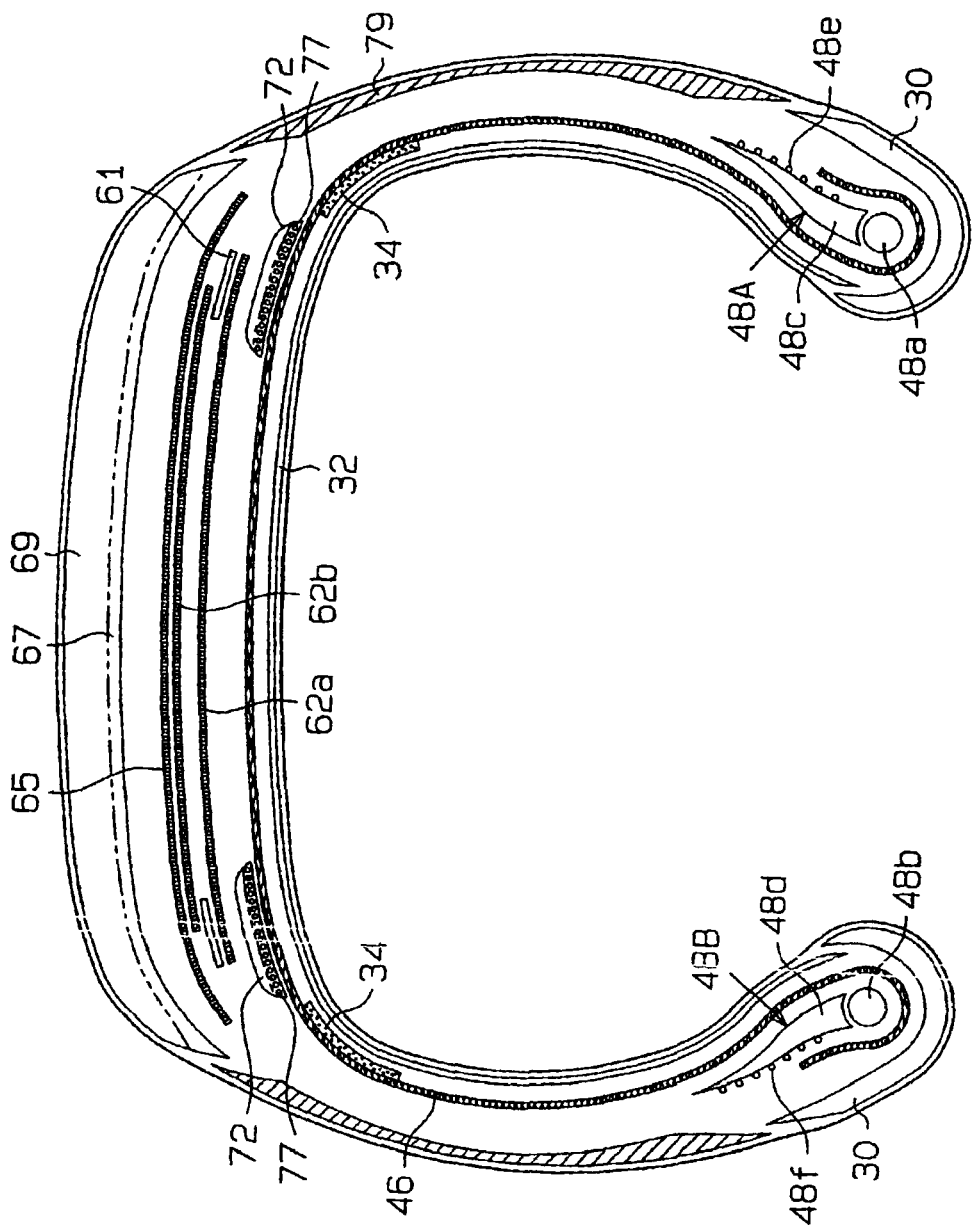
FIG. 19 is a schematic transverse cross-sectional view of a tire.

As shown in FIG. 17(a), a second ribbon 58 is wound around the other smaller-diameter drum 53 placed in the upper position, forming a ribbon cylinder 582. The drum 53 is then reversed to the lower position. Then, as shown in FIG. 17(b), the ribbon cylinder 582 is cut off along the cutter clearance groove 53a by the cutter 59, producing a narrow second belt material 62b. The second belt material 62b is then peeled off the drum 53, and accurately transferred onto a tray 63 which is separate from the tray for the wide first belt material 62a, as shown in FIG. 17(c). In FIG. 5, the tray 63 is moved to bring the second belt material 62b to a position corresponding to the outer lining element forming drum 54. The narrow second belt material 62b is wound around the wide first belt material 62a on the drum 54, thus producing belts 62 of double-layer structure as shown in FIG. 18. The emptied tray 63 is returned to a given position near the drum 54, and waits in that position.

In the present embodiment, the outside diameter D1 of the drum 52, the width E of the ribbon, the winding pitch T1 thereof, the number of turns N1 (not indicated) thereof, and the helicoidal angle $\alpha 1$ of the cutter clearance groove 52a are set to such values that the width w1 and length P1 of the first belt material 62a, which is shown in FIG. 16(d), are of dimensions suitable for a single tire. Similarly, the outside diameter D2 of the drum 53, the width E of the ribbon, the winding pitch T2 thereof, the number of turns N2 (not indicated) thereof, and the helicoidal angle $\alpha 2$ of the cutter clearance groove 53a are set to such values that the width w2 and length P2 of the second belt material 62b are of dimensions suitable for a single tire. The cords 251 of the first and second belt materials 62a, 62b have equal inclined angles $\beta 1$, $\beta 2$, and oriented in laterally symmetrical relation to each other as shown in FIG. 18, providing a balanced profile against dynamic loads imposed on the tire.

A cap band 65 of nylon or the like is supplied from a cap band stock reel 64 is wound around the belts 62 on the outer lining element forming drum 54 either fully across the belts 62 or on only lateral opposite ends thereof. The cap band 65 comprises a ribbon which is of the same shape as the ribbon 41 used in the ply station 12.

Thereafter, in FIG. 5, the outer lining element forming drum 54 is turned 180° in a horizontal plane into confronting relation to a base tread stock reel 66 and a cap tread stock reel 68. A base tread 67 supplied from the base tread stock reel 66 and a cap tread 69 supplied from the cap tread stock reel 68 are wound in layers around the belts 62 and the cap band 65 on the outer lining element forming drum 54, thus making up an outer lining element 70.

Concurrent with the formation of the outer lining element 70, belt under-cushion rubber layers 72 supplied from a belt under-cushion rubber layer stock reel 71 are wound around the belt under-cushion rubber layer winding drum 55 in given positions thereon. The third feeding apparatus 18 attracts and holds an outer surface of the outer lining element 70, removes the outer lining element 70 from the outer lining element forming drum 54, and fits the outer lining element 70 over the belt under-cushion rubber layer winding drum 55. The diameter of the belt under-cushion rubber layer winding drum 55 is then expanded to bring the belt under-cushion rubber layer 72 into close contact with the inner circumference of the belts 62 of the outer lining element 70. Thereafter, the third feeding apparatus 18 is moved to the left along the conveyor line 11 to deliver the outer lining element 70 with the belt under-cushion rubber layer 72 onto a shaping drum 75 of the shaping station 14.

In FIG. 5, an apparatus for manufacturing the belt materials 62a, 62b is represented by the reference numeral 151.
Third Apparatus Group 103

The third apparatus group 103 will be described below with reference to FIGS. 1, 4, and 6.

Figure 4:
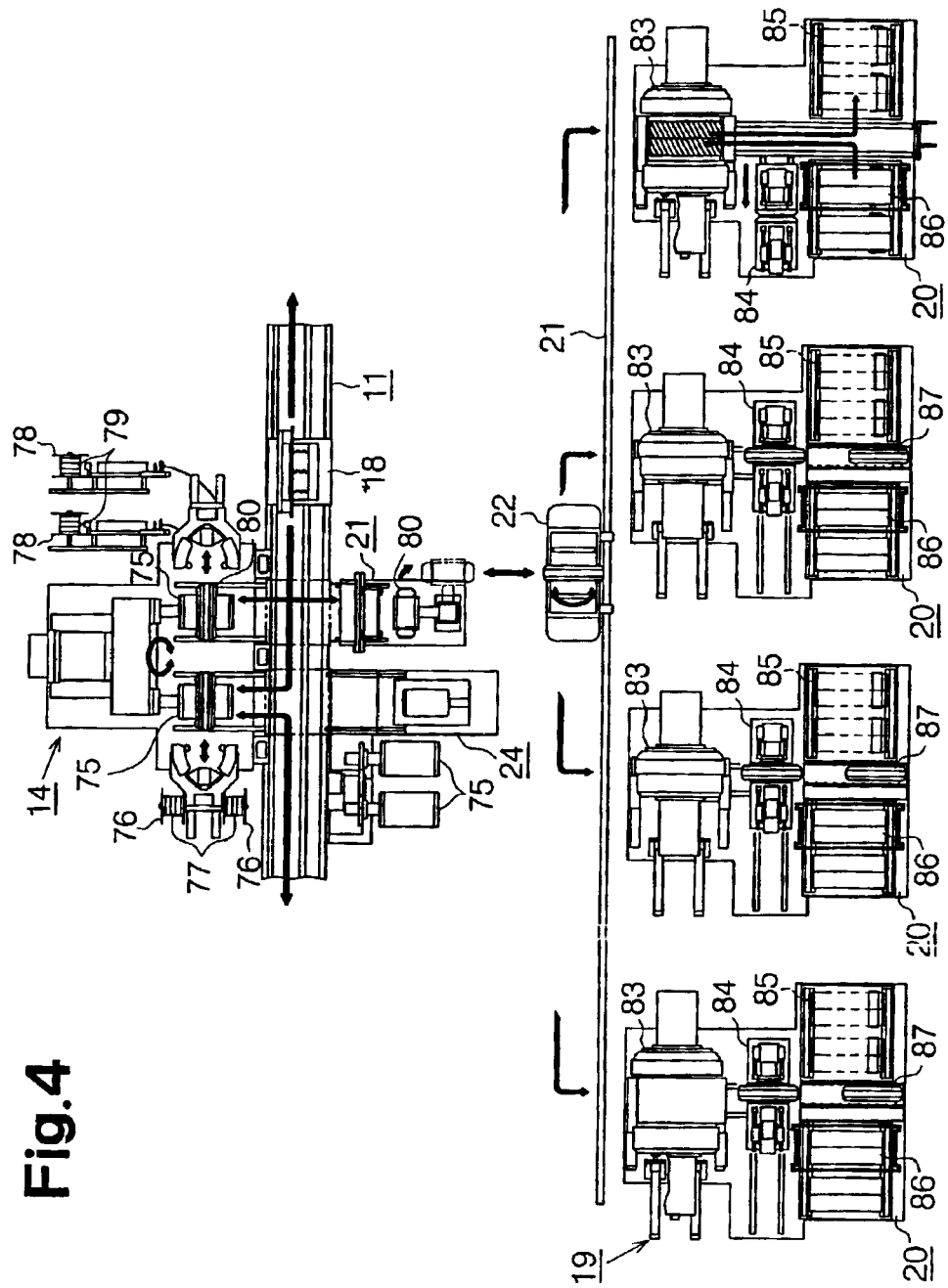
FIG. 4 is a plan view of a major part of the shaping station and the vulcanizing station shown in FIG. 1.

As shown in FIGS. 1 and 4, the shaping station 14 has shaping drums 75 for forming a green tire 80 of an inner lining element 51 fed from the band station 13 and an outer lining element 70 fed from the belt-tread station 15.

Each of the shaping drums 75 shown in FIG. 5 has a bladder for expanding the inner lining element 51 into a tire shape. The bladder has a core which comprises a first filament extending in the circumferential direction of the cylindrical body ply 46 and a second filament extending in the axial direction of the cylindrical body ply 46. The second filament has an end supported by a support member which is replaceable for easily accommodating small tire width variations. The shaping drum 75 is thus capable of coping with certain increases in the shape and dimensions.

With an inner lining element 51 fed from the second feeding apparatus 17 being fitted over the shaping drum 75, shoulder plies 77 supplied from shoulder ply stock reels 76 are wound around the inner lining element 51. The shoulder plies 77 comprise ribbons which are of the same shape as the first ribbon 41 used in the ply station 12. An outer lining element 70 fed by the third feeding apparatus 18 is then fitted over the shoulder plies 77. The bladder is then inflated to press the outer circumferential surface of the inner lining element 51 against the inner circumferential surface of the outer lining element 70, combining them integrally with each other.

Thereafter, the shaping drum 75 is turned 180° in a vertical plane, and side treads 79 supplied from side tread stock reels 78 are wound around sides of the combination of the inner and outer lining elements 51, 70, thus completing the formation of the green tire 80. During this time, stitching is automatically effected on required regions of the tire assembly.

The green tire 80 is then removed from the shaping drum 75, and transferred to the transfer apparatus 21. The transfer apparatus 21 has a mold release agent spray and a form retainer. The mold release agent spray applies a mold release agent to an inner surface of the green tire 80 to prevent the green tire 80 from sticking to a vulcanizing bladder, and the form retainer sends air into the interior of the tire 80, on which the mold release agent is applied, to retain the form. The transfer apparatus 21 is turned 90° in a horizontal plane, bringing the green tire 80 into confronting relation to one of the vulcanizers 20 of the vulcanizing station 19. During the above operation of the transfer apparatus 21, the third feeding apparatus 18 returns to its original position and waits in that position.

Fourth Apparatus Group 104 for Vulcanizing the Green Tire 80

The fourth apparatus group 104 will be described below with reference to FIGS. 1 and 4.

The delivery apparatus 22 receives the green tire 80 from the transfer apparatus 21, selects an idle one of the vulcanizers 20 of the vulcanizing station 19, moves to the selected vulcanizer 20, and loads the green tire 80 into the vulcanizer 20, which vulcanizes the green tire 80.

Specifically, as shown in FIG. 4, each of the vulcanizers 20 has a vulcanizer housing 83 having an openable and closable vulcanizing mold for holding a tire in an upright attitude, a P.C.I. (Post Cure Inflation) machine 84 for inflating and cooling a vulcanized tire, a temporary storage chamber 85 for temporarily storing used molds, and a preheating chamber 86 for preheating a mold of a next size to be used. Although not shown, the vulcanizer 20 also has a carriage for moving tires and a laid track for guiding the carriage.

The vulcanizing mold for holding a tire in an upright attitude comprises four separate mold members including two separate tread mold members which have legs with rollers for movement away from the vulcanizer housing 83 when the vulcanizer housing 83 is axially moved. The vulcanizer housing 83 is constructed to accommodate the four separate mold members with the legs thereof, so that four separate mold members can be installed in and removed from the vulcanizer housing 83 highly quickly. For changing tire sizes, the four separate mold members removed from the vulcanizer housing 83 is moved on a roller-driven vehicle onto a carriage in a standby position, and then delivered along the track into the temporary storage chamber 85, and a mold of a next size is delivered back on a carriage from the preheating chamber 86. Thus, tire sizes can quickly be changed.

The P.C.I. machine 84 used in each of the vulcanizers 20 has a mechanism for gripping the beads of the tire and two separable mold members for accommodating the outer side of the tire, unlike usual machines presently in use. The P.C.I. machine 84 also has a mechanism for discharging cooling water into the tire to drain cooling water which has been trapped in the tire. A completed tire which has been vulcanized in each of the vulcanizers 20 of the vulcanizing station 19 is delivered from the production system by a known hook conveyor or the like.

Control Apparatus 105

The control apparatus 105 which comprises a computer has a function to set the differences between finishing times of the first apparatus group 101, the second apparatus group 102, and the third apparatus group 103 to values within 30 percent of the average finishing time of the first apparatus group 101, the second apparatus group 102, and the third apparatus group 103, based on actions made by the operator on a keyboard 106.

The control apparatus 105 outputs operation signals for carrying out a process of manufacturing a tire, which comprises:

the first step of winding the first ribbon 41 composed of the filamentary cords 25 covered with the body 36 of rubber around the drums 42, thereafter cutting off the ribbon cylinder into the body ply materials 46A, 46B, and winding the body ply materials 46A, 46B, the band 35, and the beads 48A, 48B around the drum 28 to form the inner lining element 51;

the second step, concurrent with the first step, of winding the second ribbon 58 composed of the filamentary cord 251 covered with the body 361 of rubber around the drums 52, 53, thereafter helically cutting off the ribbon cylinder into the belt materials 62a, 62b, and winding the belt materials 62a, 62b and the treads 67, 69 around the drum 54 to form the outer lining element 70;

the third step of inserting the inner lining element 51 into the drum 75, inflating the inner lining element 51 into a toroidal shape, fitting the outer lining element 70 over the inner lining element 51, further inflating the inner lining element 51 to put the outer lining element 70 on the inner lining element 51 to form the green tire 80 which substantially has a final tire shape; and the fourth step of vulcanizing the green tire 80 formed in the third step with the plural vulcanizers 20.

The first and second steps are controlled to produce the inner lining element 51 and the outer lining element 70 for one tire concurrent with each other The third step is also controlled with the first and second steps to put the inner lining element 51 and the outer lining element 70 on each other also concurrently to form the green tire 80.

The number of vulcanizers is set to satisfy the following formula:

The number of vulcanizers≧(vulcanizing time/operating time)

based on the longest of the operating times of the first through third steps and the vulcanizing time of one of the vulcanizers in the fourth step.

The present embodiment offers the following advantages:

The production system includes the first apparatus group 101 for manufacturing the inner lining element 51 using the first ribbon 41 which is made of the cords 25 covered with the body 36 of rubber, and the second apparatus group 102 for manufacturing the outer lining element 70 using the second ribbon 58 which is also made of the cords 251 covered with the body 361 of rubber. The production system also has the third apparatus group 103 for forming the green tire 80 by putting the outer lining element 70 on the inner lining element 51, and the fourth apparatus group 104 for cross-linking the rubber of the green tire 80 into the completed tire 87. The production system can be installed in the plant without the need for a large space, and can increase the productivity of tires.

The first apparatus group 101 is arranged to helically wind the first ribbon 41 around the drums 42 to produce the ribbon cylinder 411 and cut off the ribbon cylinder 411 in the longitudinal direction of the drums into the body ply materials 46A, 46B as the inner lining element. The second apparatus group 102 is arranged to helically wind the second ribbon 58 around the drums 52, 53 to produce the ribbon cylinder 581 and cut off the ribbon cylinder 581 in the helical direction into the belt materials 62a, 62b as the outer lining element. The body ply materials 46A, 46B and the belt materials 62a, 62b can easily be manufactured by smaller apparatus than the conventional apparatus.

The first apparatus group 101 has the drum 42 whose circumferential length is the same as or an integral multiple of the width W of the body ply materials 46A, 46B, as they are developed, for use in a desired tire. The first apparatus group 101 is also arranged to control the winding angle α and the number of turns depending on the length L of the body ply materials as they are developed and the width E of the first ribbon 41. The body ply materials 46A, 46B for one tire or a plurality of tires can thus be manufactured with ease.

The second apparatus group 102 includes the apparatus 121 for manufacturing the belt materials 62a, 62b by controlling the widths E, the winding pitches T1, T2, and the numbers N1, N2 of turns of the second ribbons 58 wound around the two drums 52, 53 which have the respective outside diameters D1, D2 and the respective lengths, to manufacture the ribbon cylinders 581, 582, and helically cutting off the ribbon cylinders 581, 582 at the respective helicoidal angles α1, α2 into the belt materials 62a, 62b which have the respective widths W1, W2, the respective lengths P1, P2, and the inclined cord angles β1, β2, for use in a desired tire. The two belt materials 62a, 62b for one tire can thus be manufactured with ease.

The first apparatus group 101 includes a plurality of apparatus for producing or assembling the body ply 46, the inner liner 32, and the pair of lateral beads 48A, 48B which make up the inner lining element 51. Therefore, the inner lining element 51 can be manufactured with ease.

The second apparatus group 102 includes a plurality of apparatus for producing or assembling the belts 62, the cap band 65, the treads 67, 69, and the belt under-cushion rubber layer 72 which make up the outer lining element 70. Therefore, the outer lining element 70 can be manufactured with ease.

The tire production system can easily manufacture the green tire 80 because it includes the third apparatus group 103 for putting the outer lining element 70 on the inner lining element 51 into the green tire 80.

The third apparatus group 103 includes at least an apparatus for assembling the side treads 79, of apparatus for assembling the shoulder plies 77 onto the belt ends and the side treads 79 and the side plies onto the opposite sides of the tire. Therefore, the side treads 79 can be assembled with ease.

The apparatus groups are designed to produce the inner lining element 51, the outer lining element 70, and the green tire 80 such that the differences between finishing times of the first apparatus group 101 for manufacturing the inner lining element 51, the second apparatus group 102 for manufacturing the outer lining element 70, and the third apparatus group 103 for putting the outer lining element 70 on the inner lining element 51 into the green tire 80 fall within 30 percent of the average finishing time of the first apparatus group 101, the second apparatus group 102, and the third apparatus group 103. Consequently, the differences between finishing times of the apparatus groups can be reduced to increase the tire production capability.

The tire production system includes the fourth apparatus group 104 for cross-linking the green tire 80 into the completed tire 87. Therefore, completed tires can be produced from materials within one production system.

The tire production system has the linear conveyor line 11. The first apparatus group 101 is arranged from one end to an intermediate region of the conveyor line 11, and the second apparatus group 102 is arranged from the other end to intermediate region of the conveyor line 11. The third apparatus group 103 for forming the green tire 80 is disposed in the intermediate region of the conveyor line 11. Therefore, various tire components can quickly be conveyed on the conveyor line 11 for increased operation efficiency.

Because the first apparatus group 101, the second apparatus group 102, and the third apparatus group 103 are disposed on the first side of the conveyor line 11, the materials and the tire components can be supplied efficiently and quickly on one side of the conveyor line 11.

Because the fourth apparatus group 104 is disposed on the side of the conveyor line 11 which is opposite to the first through third apparatus groups 101 through 103, the plural vulcanizers can be placed in a small space along the conveyor line 11.

The ply station 12, the band station 13, the shaping station 14, and the belt-tread station 15 are disposed on the first side of the linear conveyor line 11. The first feeding apparatus 16 for feeding the body ply 46 from the ply station 12 to the band station 13, the second feeding apparatus 17 for feeding the inner lining element 51 from the band station 13 to the shaping station 14, and the third feeding apparatus 18 for feeding the outer lining element 70 from the belt-tread station 15 to the shaping station 14 are movably supported on the conveyor line 11. The vulcanizing station 19 which comprises the plural vulcanizers 20 is disposed on the second side of the conveyor line 11 which is opposite to the first side thereof. The delivery apparatus 22 for receiving the green tire 80 from the shaping station 14 via the third feeding apparatus 18 and delivering the green tire 80 to each of the vulcanizers 20 of the vulcanizing station 19 is disposed between the vulcanizing station 19 and the shaping station 14.

Consequently, the stations 12 through 15, 19 and the feeding apparatus 16 through 18 between these stations of the overall production system can be installed without the need for a large space in the plant. The productivity of the entire system is increased because intermediate products formed in the stations 12 through 15 can quickly be fed to next stations.

The first ribbon 41 and the second ribbon 58 which comprise the cords 25, 251 covered with the bodies 36, 361 of rubber for use in the inner lining element 51 and the outer lining element 70 has their width E set to values ranging from 3 to 30 mm, preferably 5 to 15 mm. Accordingly, the number of spools on which the cords 25, 251 are wound can be reduced, and the rubber extruders 40, 57 for extruding the ribbons can be reduced in size.

The first and second steps are designed to form the inner lining element and the outer lining element for one tire concurrent with each other, and the third step is designed to put the inner lining element and the outer lining element on each other concurrent with the first and second steps. The number of vulcanizers is set to satisfy the formula: The number of vulcanizers≧(vulcanizing time/operating time) based on the longest of the operating times of the first through third steps and the vulcanizing time of one of the vulcanizers in the fourth step.

Consequently, the green tire 80 can be produced efficiently at a reduced cost. Since the completed tire can be produced from materials according to the above production method, the quality thereof is increased and stabilized for an increased yield. Stated otherwise, any idle times while tire components including body plies, belts, etc. are being formed and until the vulcanizing process is completed are eliminated almost entirely, and any adverse effect which aging of those tire components may have can be reduced. Thus, it is possible to manufacture high-quality radial tires.

The dip layer 27 is formed around each of the filaments 25a, and the plural cords 25 are passed through the rubber extruder 40 and coated with the body 36 of rubber, forming the first ribbon 41. The body ply 46 is produced using the first ribbon 41. The plural cords 251 made of the filaments 251a covered with the thin layer 271 of rubber are passed through the rubber extruder 57, and coated with the body 361 of rubber, forming the second ribbon 58. The belts 62 are produced using the second ribbon 58. The tire 87 is manufactured by the production system using the body ply 46 and the belts 62. Therefore, the tire reinforcements including the body ply and the belts are firmly bonded to the tire rubber at respective positions, thus increasing the durability of the tire.

The conveyor line 11 is provided as the automatic conveyor apparatus for conveying the inner lining element 51 manufactured by the first apparatus group 101 and the outer lining element 70 manufactured by the second apparatus group 102 to the third apparatus group 103. Thus, the elements 51, 70 can automatically be fed quickly.

The conveyor line 11 comprises the fixed track (not shown) and the feeding apparatus 16 through 18 having carriages (not shown) reciprocally movable along the track. Between the first apparatus group 101 and the third apparatus group 103, there is used at least one of the feeding apparatus 16, 17 to feed the inner lining element from the first apparatus group 101 to the third apparatus group 103. Between the second apparatus group 102 and the third apparatus group 103, there is used at least one feeding apparatus 18 to feed the outer lining element from the second apparatus group 102 to the third apparatus group 103. Accordingly, these components can automatically be fed quickly.

The apparatus 121 for manufacturing the body ply material 46A is disposed in the first apparatus group 101 such that the direction Y1 of the axis of the ribbon winding drum 42 of the first apparatus group 101 extends parallel to the longitudinal direction X of the conveyor line 11. The apparatus 151 for manufacturing the belt materials 62a, 62b is disposed in the second apparatus group 102 such that the direction Y2 of the axis of the ribbon winding drum 52 of the second apparatus group 102 extends perpendicularly to the longitudinal direction X of the conveyor line 11. Therefore, the body ply material 46A and the belt materials 62a, 62b requires no mechanism for changing directions while they are being fed. The apparatus are thus simplified in structure, and are capable of manufacturing tires easily at a reduced cost with stable quality.

The longitudinal direction Y3 of the body ply material 46A as it is developed which is manufactured by the first apparatus group 101, and the longitudinal direction Y4 of the belt materials 62a, 62b as they are developed which are manufactured by the second apparatus group 102 are parallel to the longitudinal direction X of the conveyor line 11. The body ply material 46A is fed to a position near the end of the conveyor line 11, and wound into a cylindrical shape around the body ply forming drum 38, thus forming the body ply 46. The belt materials 62a, 62b are fed to a position near the other end of the conveyor line 11, and wound into a cylindrical shape around the outer lining element forming drum 54, thus forming the belts 62. The body ply 46 is formed into the inner lining element 51 while being fed along the conveyor line 11, and the belts 62 are formed into the outer lining element 70 when the band and the tread are wound around the outer lining element forming drum 54. The body ply 46, the inner lining element 51, the outer lining element 70 are fed in a rolling direction on the conveyor line 11 toward the third apparatus group 103 in the intermediate region of the feed line 11. Therefore, it is not necessary to change the direction in which the body ply material 46A, the inner lining element 51, and the outer lining element 70 are fed, and any mechanism for changing that direction is not required. The apparatus are thus simplified in structure, and are capable of manufacturing tires easily at a reduced cost with stable quality.

The first ribbon 41 has the plural cords 25 embedded therein parallel to each other at equal pitches, and is wound at equal pitches around the drum to form the ribbon cylinder 411. The body ply materials 46A, 46B are produced from the ribbon cylinder 411, and used as the inner lining element 51. The other second ribbon 58 has the plural cords 251 embedded therein parallel to each other at equal pitches, and is wound at equal pitches around the drum to form the ribbon cylinders 581, 582. The belt materials 62a, 62b are produced from the ribbon cylinders 581, 582, and used as the outer lining element 70. Therefore, no unbalanced structure is produced in the cords 25, 251, making it possible to improve the uniformity of the tire 87, eliminate quality irregularities from the tire 87, and increase the durability of the tire 87.

Figure 20:
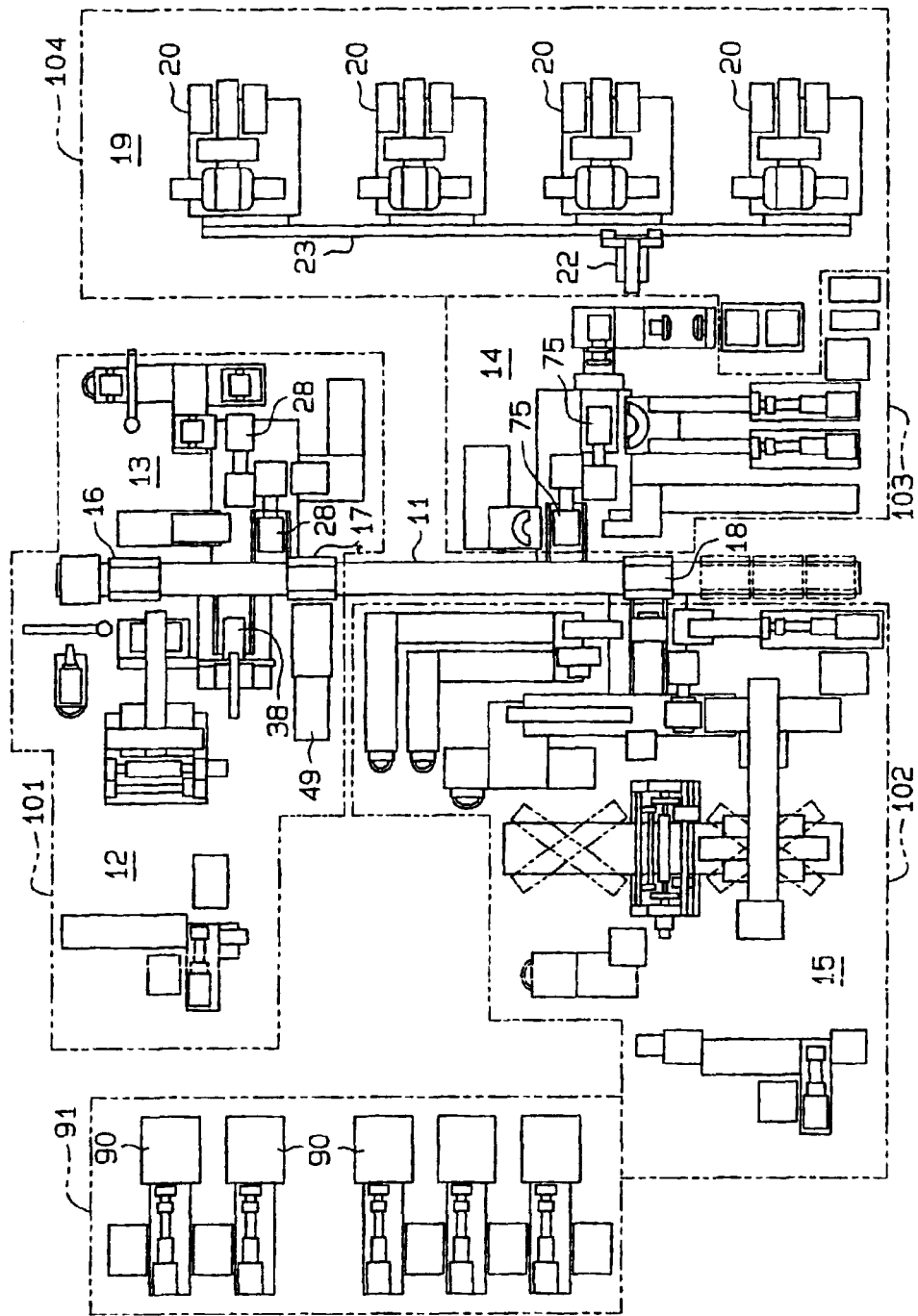
FIG. 20 is a schematic plan view of a modified tire production system.

The above embodiment may be modified as follows:

FIG. 20 shows another embodiment of the layout of the apparatus groups. In this embodiment, the ply station 12 of the first apparatus group 101 is disposed on the first side of the conveyor line 11, and the band station 13 of the first apparatus group 101 is disposed on the second side of the conveyor line 11 which is opposite to the first side. The belt-tread station 15 of the second apparatus group 102 is disposed on the first side of the conveyor line 11 adjacent to the ply station 12. The shaping station 14 of the third apparatus group 103 is disposed on the second side of the conveyor line 11 adjacent to the band station 14. The fourth apparatus group 104 is disposed to a side of the band station 13 and the shaping station 14.

A component supply station 91 having a plurality of extruders 90 for extruding various rubber components for use in tires is disposed to the left of the ply station 12 and the belt-tread station 15. In the component supply station 91, rubber components such as cap treads, base treads, side treads, tread cushions, rubber chafers, or inner liners are extruded to a given shape, and stored on a stock reel so that they can be wound in one or more layers when tires are formed. Alternatively, the above rubber components may be continuously extruded as ribbons having a width ranging from 3 to 30 mm, preferably from 5 to 15 mm, as is the case with body plies and belts, and may be wound and stored on a plurality of stock reels. According to the alternative, all the tire components of the green tire 80 other than bead-related components such as bead wires 48a, fillers 48c, and bead insert plies 48e can be formed as ribbon-like rubber components.

In this embodiment, the conveyor line 11 extends linearly, and the first through fourth apparatus groups 101 through 104 may be held in a rectangular frame which is of a nearly square shape, and hence their installation space may be reduced.

Figure 8:
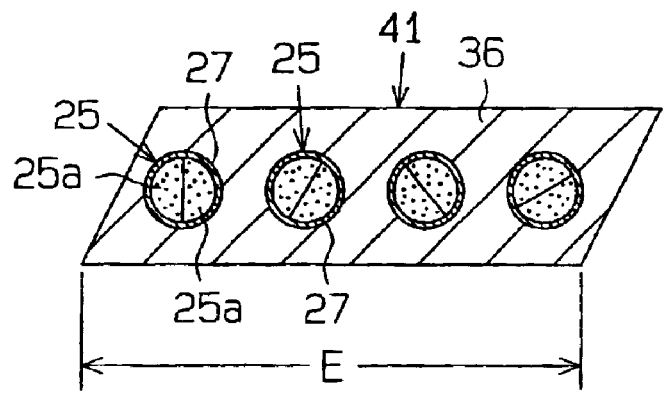
FIG. 8 is an enlarged transverse cross-sectional view of a ribbon.

In the structure of the first ribbon 41 shown in FIG. 8, the thickness of the body 36 of rubber may be increased about twice, and two layers of the cords 25 may be embedded as upper and lower layers. In the upper and lower layers, the cords 25 may be vertically aligned with each other or may be arranged in a zigzag pattern. For the first ribbon 41, each layer may contain 8 through 14 cords 25. The cords 25 may be embedded in three or more layers.

With the above arrangement, the body ply 46 having a plurality of cord layers may be produced in one process.

Although not shown, in the embodiment shown in FIG. 20, the fourth apparatus group 104 may be disposed laterally of the second apparatus group 102 and the third apparatus group 103, and the green tire may be transferred to the delivery apparatus 22 using the conveyor line 11.

Although not shown, the first apparatus group 101, the second apparatus group 102, and the third apparatus group 103 may be installed on an upper or lower floor of the plant, and the fourth apparatus group 104 may be installed on the lower or upper floor of the plant. Alternatively, the first apparatus group 101 and the second apparatus group 102 may be installed on an upper or lower floor of the plant, and the third apparatus group 103 and the fourth apparatus group 104 may be installed on the lower or upper floor of the plant.

Figure 21:
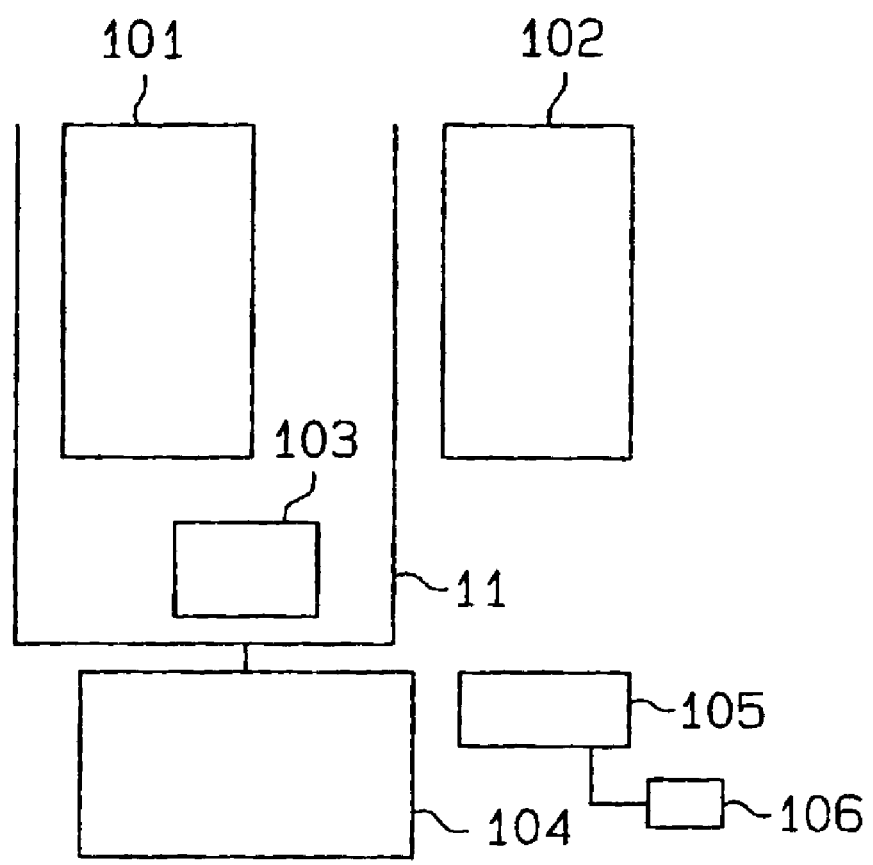
FIG. 21 is a schematic plan view of another modified tire production system.

As shown in FIG. 21, a conveyor line 11 having a U shape as viewed in plan may be laid, and the first apparatus group 101 may be disposed so as to extend from one end of the conveyor line 11 toward the bend of the conveyor line 11. The second apparatus group 102 may be disposed so as to extend from the other end of the conveyor line 11 toward the bend of the conveyor line 11. The third apparatus group 103 may be disposed at the bend of the conveyor line 11, and the fourth apparatus group 104 may be disposed outside of the bend of the conveyor line 11. In this embodiment, the production system may be installed in a plant which has a square shape as viewed in plan, without wasting an undue space.

Although not shown, a beam manufacturing apparatus for manufacturing the beads 48A, 48B may be disposed in association with the bead stock unit 49. The beam manufacturing apparatus has a rubber extruder for covering a single wire or a plurality of wires with rubber, and winds the rubber-coated wire or wires in a plurality of turns around a drum, forming a ring-shaped bead.

In the above modification, rubber components and reinforcements prepared by the component supply station 91 and stored on stock reels are supplied to the forming drums. However, rubber components and reinforcements may be supplied directly to the forming drums from extruders mounted in the respective stations.

In such an arrangement, the rubber chafers 30, the inner liner 32, the liner pads 34, the shoulder plies 77, the side treads 78, the base tread 67, the cap tread 69, the body ply 46, the belts 62, and the belt under-cushion rubber layer 72 may be manufactured from row materials (e.g., various compositions such as natural rubber, synthetic rubber, carbon, sulfur, and various cords) and supplied in one plant. Tires can thus be manufactured from row materials in the same plant for increased tire quality and production efficiency. Since the present production system allows the inventory of intermediate tire components to be reduced, the overall installation space of the production system can be reduced.

In the belt-tread station 15 according to the above embodiment, the tray 63 carrying the first belt material 62a and the tray 63 carrying the second belt material 62b are alternately supplied to the outer lining element forming drum 54. Instead, the tray 63 carrying the first belt material 62a may be placed in an upper position and the tray 63 carrying the second belt material 62b may be placed in a lower position, so that they are stacked one over the other, and may be simultaneously supplied to the outer lining element forming drum 54. Then, the first belt material 62a in the upper tray 63 may be first wound around the outer lining element forming drum 54, and the emptied tray 63 is temporarily stored in a given position. Then, the second belt material 62b in the lower tray 63 may be wound around the first belt material 62a, and thereafter the emptied trays 63 stacked one over the other may be returned to a given position.

Industrial Applicability

According to the present tire production system, as described above, the stations of the system and the feeding apparatus between the stations can be installed without the need for a large space in the plant. Intermediate products produced in the stations can quickly be fed to next stations. The productivity of the system as a whole is increased, and the quality of products manufactured by the system is also stabilized.

According to the present tire production method, filaments and covering rubber are bonded firmly to each other with a good adhesion, and any idle times while tire reinforcements are being formed and until the vulcanizing process is completed are eliminated almost entirely, and any adverse effect which aging of those tire components may have can be reduced. Since the reinforcements are positioned uniformly, it is possible to manufacture high-quality radial tires of excellent uniformity.

The high-quality tire level can be achieved because filaments and covering rubber are bonded firmly to each other with a good adhesion.

What is claimed is:

1. A system for producing a tire by individually manufacturing an inner lining element and an outer lining element and putting the outer lining element on an outer circumference of the inner lining element to form a green tire, comprising:

a first apparatus group for manufacturing said inner lining element using a first ribbon of rubberized cord fabric, wherein said first apparatus group is arranged to helically wind said first ribbon around a first drum to produce a first ribbon cylinder and arranged to cut off the first ribbon cylinder in a longitudinal direction of the first drum to form a body ply material as the inner lining element, wherein the first apparatus group includes:
(i) a peeling bar for peeling off the body ply material from the first drum;
(ii) a first tray for receiving the body ply material below the first drum, wherein the tray is moved to a position below a body ply forming drum and then lifted to bring the body ply material into contact with the body ply forming drum, and wherein the body ply forming drum is rotated and the tray is moved forward, thus winding the body ply material around the body ply forming drum; and
(iii) an end joining apparatus for joining a starting end and a terminal end of the body ply material to each other;
a second apparatus group for manufacturing said outer lining element using a second ribbon of rubberized cord fabric, wherein said second apparatus group is arranged to helically wind said second ribbon around a second drum to produce a second ribbon cylinder and arranged to cut off the second ribbon cylinder in a helical direction to form a belt material, wherein the belt material is used to form the outer lining element, wherein said second apparatus group includes:
a second tray for receiving the belt material below the second drum, wherein the second tray is moved to a position below an outer lining element forming drum and lifted to bring the belt material into contact with the outer lining element forming drum, and wherein the outer lining element forming drum is rotated and the second tray is moved forward to wind the belt material around the outer lining element forming drum;
a third apparatus group for forming the green tire by putting said outer lining element on said inner lining element; and
a fourth apparatus group including at least one vulcanizer for cross-linking the green tire into a completed tire.

2. The system for producing a tire according to claim 1, wherein said first drum has a circumferential length that is the same as or an integral multiple of the width of said body ply material, as it is rolled out, for use in a desired tire, and said first apparatus group is arranged to control the winding angle and the number of turns depending on the length of the body ply material and the width of said first ribbon for thereby manufacturing the body ply material.

3. The system for producing a tire according to claim 1, wherein said second apparatus group has an apparatus for manufacturing said belt material by controlling winding pitches and the number of turns of said ribbon having a predetermined width around the second drum having an outside diameter thereby to produce the second ribbon cylinder, helically cuffing off the second ribbon cylinder at a helicoidal angle to produce the belt material having a predetermined width, a predetermined length, and a predetermined inclined cord angle for use in a desired tire.

4. The system for producing a tire according to claim 1, wherein said inner lining element comprises a body ply, an inner liner, and a pair of beads, said first apparatus group including a plurality of apparatus for producing or assembling the body ply, the inner liner, and the beads.

5. The system for producing a tire according to claim 1, wherein said outer lining element comprises at least belts and a tread selected from a group consisting of the belts, a cap band, the tread, and a belt under-cushion rubber layer, said second apparatus group including a plurality of apparatus for producing or assembling the belts and the tread.

6. The system for producing a tire according to claim 1, wherein said third apparatus group includes an apparatus for joining side treads to opposite sides of a tire.

7. The system for producing a tire according to claim 1, wherein said first apparatus group, said second apparatus group, and said third apparatus group are designed to produce the inner lining element, the outer lining element, and the green tire such that the differences between finishing times of said first apparatus group, said second apparatus group, and said third apparatus group fall within 30 percent of the average finishing time thereof.

8. The system for producing a tire according to claim 1, wherein said first apparatus group, said second apparatus group, and said third apparatus group are interconnected by a conveyor line, and said conveyor line has a plurality of feeding apparatus for feeding tire components.

9. The system for producing a tire according to claim 8, wherein said third apparatus group is disposed adjacent to said first apparatus group and said second apparatus group.

10. The system for producing a tire according to claim 8, wherein a ply station and a band station of said first apparatus group, said band station and a shaping station of said third apparatus group, and a belt-tread station of said second apparatus group and said shaping station are disposed adjacent to each other.

11. The system for producing a tire according to claim 8, wherein said fourth apparatus group is disposed adjacent to said third apparatus group.

12. The system for producing a tire according to claim 8, wherein said conveyor line is linearly disposed, said first apparatus group being arranged from one end to an intermediate region of said conveyor line, said second apparatus group being arranged from the other end to intermediate region of said conveyor line, said third apparatus group for forming said green tire being disposed in the intermediate region of said conveyor line.

13. The system for producing a tire according to claim 12, wherein said first apparatus group, said second apparatus group, and said third apparatus group are disposed on a first side of said conveyor line.

14. The system for producing a tire according to claim 13, wherein said fourth apparatus group is disposed on a second side of said conveyor line which is opposite to said first side.

15. The system for producing a tire according to claim 8, wherein said conveyor line has a U shape as viewed in plan, said first apparatus group being disposed so as to extend from one end of said conveyor line toward the bend thereof, said second apparatus group being disposed so as to extend from the other end of said conveyor line toward the bend thereof, and said third apparatus group being disposed at the bend of said conveyor line.

16. The system for producing a tire according to claim 15, wherein said fourth apparatus group is disposed outside of the bend of said conveyor line.

17. The system for producing a tire according to claim 8, wherein said conveyor line is formed straight, wherein said first apparatus group has a ply station and a band station which are disposed astride of said conveyor line at one end thereof, said second apparatus group is disposed at the other end of said conveyor line adjacent to said ply station, and said third apparatus group is disposed in alignment with said second apparatus group across said conveyor line.

18. The system for producing a tire according to claim 17, wherein said fourth apparatus group is disposed adjacent to said third apparatus group.

19. The system for producing a tire according to claim 1, further comprising an automatic feeding apparatus, wherein the automatic feeding apparatus feeds the inner lining element, which is manufactured by said first apparatus group, and the outer lining element, which is manufactured by said second apparatus group, to said third apparatus group.

20. The system for producing a tire according to claim 12, wherein said conveyor line comprises feeding apparatus having carriages reciprocally movable along a fixed track, at least one feeding apparatus being used between said first apparatus group and said third apparatus group to feed the inner lining element from said first apparatus group to said third apparatus group, and at least one feeding apparatus being used between said second apparatus group and said third apparatus group to feed the outer lining element from said second apparatus group to said third apparatus group.

21. The system for producing a tire according to claim 12, wherein a ply station for forming a body ply, a band station for forming the inner lining element of a band, a body ply, and beads, a shaping station for forming a green tire of the inner lining element and the outer lining element, and a belt-tread station for forming the outer lining element are disposed on a first side of the conveyor line which extends linearly, and extend along the conveyor line from one end to the other end thereof, a first feeding apparatus for feeding the body ply from the ply station to the band station, a second feeding apparatus for feeding the inner lining element from the band station to the shaping station, and a third feeding apparatus for feeding the outer lining element from the belt-tread station to the shaping station are movably supported on said conveyor line, a vulcanizing station which comprises the fourth apparatus group is disposed on a second side of the conveyor line which is opposite to the first side thereof, and a delivery apparatus for receiving the green tire from the shaping station and delivering the green tire to each of vulcanizers of the vulcanizing station is disposed between the vulcanizing station and the shaping station.

22. The system for producing a tire according to claim 1, wherein the first and second ribbons composed of the cords coated with the rubber for use as the inner lining element and the outer lining element have a width ranging from 3 to 30 mm.

23. The system for producing a tire according to claim 4, further comprising a plurality of apparatus for manufacturing intermediate tire components including an inner liner, rubber chafers, liner pads, and a pair of beads for use as the inner lining element, from raw materials.

24. The system for producing a tire according to claim 5, further comprising a plurality of apparatus for manufacturing intermediate tire components including a cap band, treads, and a belt under-cushion rubber layer for use as the outer lining element, from raw materials.

25. The system for producing a tire according to claim 22, wherein said first and second ribbons have a width ranging from 5 to 15 mm.

26. The system for producing a tire according to claim 22, wherein said first ribbon comprises a plurality of layers of the cords embedded in the rubber.

27. A method of producing a tire, comprising:

a first step of winding a first ribbon composed of filamentary cords coated with rubber around a first drum, thereafter cutting off a ribbon cylinder to form a body ply material, and winding or fitting the body ply material, a band, and beads around a band forming drum to form an inner lining element, wherein the first step includes peeling off the body ply material from the first drum by use of a peeling bar;

receiving the body ply material on a first tray below the first drum, wherein the tray is then moved to a position below a body ply forming drum and then lifted to bring the body ply material into contact with the body ply forming drum, and wherein the body ply forming drum is rotated and the tray is moved forward, thus winding the body ply material around the body ply forming drum; and joining a starting end and a terminal end of the body ply material each other;

a second step, concurrent with the first step, of winding a first portion of a second ribbon composed of filamentary cord coated with rubber around a second drum, thereafter helically cutting off a ribbon cylinder to form a first belt material, and winding a second portion of the second ribbon, thereafter helically cuffing off a second ribbon cylinder to form a second belt material, and then winding at least said first belt material, said second belt material and a tread around an outer lining element forming drum to form an outer lining element, wherein the second step includes receiving the belt material on a second tray below the second drum, wherein the second tray is then moved to a position below an outer lining element forming drum and lifted to bring the belt material into contact with the outer lining element forming drum, and wherein the outer lining element forming drum is rotated and the second tray is moved forward to wind the belt material around the outer lining element forming drum;

a third step of puffing said inner lining element on a shaping drum, inflating the inner lining element, putting said outer lining element on the inner lining element to form a green tire which substantially has a final tire shape; and a fourth step of vulcanizing the green tire formed in the third step.

28. The method of producing a tire according to claim 27, wherein said first through third steps are set to produce the inner lining element, the outer lining element, and the green tire for one tire concurrent with each other, and also to satisfy the formula: the number of vulcanizers≧(vulcanizing time/operating time) based on the longest of the operating times of the first through third steps and the vulcanizing time of one vulcanizer in the fourth step.

* * * * *